United States Patent
Ellis et al.

(10) Patent No.: US 9,087,334 B2
(45) Date of Patent: *Jul. 21, 2015

(54) METHOD AND SYSTEM FOR DYNAMICALLY INCORPORATING ADVERTISING CONTENT INTO MULTIMEDIA ENVIRONMENTS

(75) Inventors: Richard D. Ellis, Carnation, WA (US); Christopher R. Newcombe, Kirkland, WA (US); Michael Yiu-kwan Siu, Bellevue, WA (US); Michael T. Stradley, Seattle, WA (US); Chris Oje, Kirkland, WA (US)

(73) Assignee: Noatak Software LLC, Las Vegas, NV (US)

( * ) Notice: Subject to any disclaimer, the term of this patent is extended or adjusted under 35 U.S.C. 154(b) by 2055 days.

This patent is subject to a terminal disclaimer.

(21) Appl. No.: 11/513,904

(22) Filed: Aug. 30, 2006

(65) Prior Publication Data

US 2007/0061204 A1  Mar. 15, 2007

Related U.S. Application Data

(63) Continuation of application No. 09/998,901, filed on Nov. 29, 2001.

(60) Provisional application No. 60/250,060, filed on Nov. 29, 2000.

(51) Int. Cl.
*G06Q 30/00* (2012.01)
*G06Q 30/02* (2012.01)
(Continued)

(52) U.S. Cl.
CPC ............... *G06Q 30/02* (2013.01); *A63F 13/12* (2013.01); *G06Q 30/0243* (2013.01);
(Continued)

(58) Field of Classification Search
USPC .................................. 705/14.12, 14.49, 14.73
See application file for complete search history.

(56) References Cited

U.S. PATENT DOCUMENTS

| | | |
|---|---|---|
| 4,731,841 A | 3/1988 | Rosen |
| 5,201,000 A | 4/1993 | Matyas |

(Continued)

FOREIGN PATENT DOCUMENTS

EP  0534420 A2  3/1993

OTHER PUBLICATIONS

Arkin, B., et al., "How We Learned to Cheat in Online Poker: A Study in Software Security," Reliable Software Technologies, Software Security Group, Originally appeared on Developer.com Sep. 1999, 9 pages.

(Continued)

*Primary Examiner* — Michael Bekerman

(57) ABSTRACT

Methods and systems for dynamically incorporating advertising content into multimedia environments, such as games, are provided. Example embodiments include a dynamic inserter, which selects content, based upon a set of criteria, to deliver to a receiving client system, such as a game client. The receiving client system typically dynamically determines locations within the game where advertisements are desirably inserted. Associated with these locations are ad tags that specify criteria for the ads including, for example ad type, ad genre, and scheduling information, which are sent by the client system to the dynamic inserter to select appropriate ads. The dynamic inserter selects ads based upon the criteria and sends them to the client system, which selects them for ad tags with conforming criteria. The client system then renders the selected ad in the appropriate location.

26 Claims, 9 Drawing Sheets

(51) Int. Cl.
A63F 13/30 (2014.01)
G07F 17/32 (2006.01)

(52) U.S. Cl.
CPC ....... *G06Q 30/0252* (2013.01); *G06Q 30/0264* (2013.01); *G06Q 30/0267* (2013.01); *G06Q 30/0272* (2013.01); *G06Q 30/0273* (2013.01); *G07F 17/32* (2013.01); *G07F 17/3227* (2013.01); *A63F 2300/535* (2013.01); *A63F 2300/5506* (2013.01); *A63F 2300/5593* (2013.01)

(56) References Cited

U.S. PATENT DOCUMENTS

| | | | |
|---|---|---|---|
| 5,539,822 A | 7/1996 | Lett | |
| 5,553,242 A | 9/1996 | Russell | |
| 5,717,756 A | 2/1998 | Coleman | |
| 5,757,891 A | 5/1998 | Wang | |
| 5,946,664 A | 8/1999 | Ebisawa | |
| 5,982,898 A | 11/1999 | Hsu | |
| 6,036,601 A * | 3/2000 | Heckel | 705/14.46 |
| 6,058,397 A | 5/2000 | Barrus et al. | |
| 6,084,969 A | 7/2000 | Wright | |
| 6,099,408 A | 8/2000 | Schneier | |
| 6,108,637 A | 8/2000 | Blumenau | |
| 6,196,920 B1 * | 3/2001 | Spaur et al. | 463/42 |
| 6,226,618 B1 | 5/2001 | Downs | |
| 6,424,718 B1 | 7/2002 | Holloway | |
| 6,447,396 B1 | 9/2002 | Galyean, III | |
| 6,508,710 B1 | 1/2003 | Paravia | |
| 6,599,194 B1 | 7/2003 | Smith | |
| 6,616,533 B1 * | 9/2003 | Rashkovskiy | 705/14.1 |
| 6,654,886 B1 | 11/2003 | Challener | |
| 6,668,323 B1 | 12/2003 | Challener | |
| 6,792,113 B1 | 9/2004 | Ansell | |
| 6,928,414 B1 | 8/2005 | Kim | |
| 6,954,728 B1 | 10/2005 | Kusumoto et al. | |
| 7,024,690 B1 | 4/2006 | Young | |
| 7,047,411 B1 | 5/2006 | DeMello | |
| 7,051,209 B1 | 5/2006 | Brickell | |
| 7,089,211 B1 | 8/2006 | Trostle | |
| 7,251,632 B1 | 7/2007 | Ogg | |
| 7,461,249 B1 | 12/2008 | Pearson | |
| 8,002,617 B1 | 8/2011 | Uskela et al. | |

| | | |
|---|---|---|
| 2001/0034661 A1 | 10/2001 | Ferreira |
| 2002/0156858 A1 | 10/2002 | Hunter |
| 2004/0152517 A1 | 8/2004 | Hardisty et al. |

OTHER PUBLICATIONS

Final Office Action for U.S. Appl. No. 09/998,901, mailed Apr. 2, 2008.
Final Office Action for U.S. Appl. No. 09/998,901, mailed Nov. 12, 2009.
Non-Final Office Action for U.S. Appl. No. 09/998,901, mailed May 2, 2006.
Non-Office Action for U.S. Appl. No. 09/998,901, mailed Feb. 18, 2009.
Intiher, "OLA Offers New Form of Advertising," GameWeek Online, Oct. 2, 2000.
Cortright, "What is a 'Bulk Encryption Key'?," Newsgroups: comp.groupware.lotus-notes.admin, Jul. 28, 1999, 1 page.
"Massively Multiplayer Online Role-Playing Game," Wikipedia, <http://en.wikipedia.org/wiki/MMORPG>, [retrieved Sep. 11, 2007], 10 pages.
Non-Final Office Action on U.S. Appl. No. 11/513,819, mailed Aug. 2, 2011.
Non-Final Office Action on U.S. Appl. No. 11/513,892, mailed Jul. 20, 2011.
Non-Final Office Action on U.S. Appl. No. 11/513,903, mailed Aug. 8, 2011.
Final Office Action on U.S. Appl. No. 11/513,892, mailed Feb. 8, 2012.
Final Office Action on U.S. Appl. No. 11/513,903, mailed Feb. 29, 2012.
Final Office Action on U.S. Appl. No. 11/513,819, mailed Feb. 16, 2012.
Notice of Allowance on U.S. Appl. No. 11/513,903, mailed Jun. 1, 2012.
Non-Final Office Action on U.S. Appl. No. 11/513,892, mailed Jan. 29, 2014.
Non-Final Office Action on U.S. Appl. No. 09/998,901, mailed Aug. 14, 2014.
Notice of Allowance on U.S. Appl. No. 11/513,892, mailed May 5, 2014.
Notice of Allowance on U.S. Appl. No. 09/998,901, mailed Feb. 4, 2015.

* cited by examiner

|  | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ |  |
|---|---|---|---|---|---|---|---|---|---|---|---|---|---|
| | $P_1$ | | | | | | | | | $P_2$ | | | 56K |
| | | $P_1$ | | | | | | | | | $P_2$ | | 56K |
| | $P_1$ | | | $P_2$ | | | $P_3$ | | | $P_4$ | | | DSL |
| | | | $P_1$ | | | | | | | | | $P_2$ | 56K |
| | $P_1$ | $P_2$ | $P_3$ | $P_4$ | $P_5$ | $P_6$ | $P_7$ | $P_8$ | $P_9$ | $P_{10}$ | $P_{11}$ | $P_{12}$ | T1 |
| | | | | $P_1$ | | | | | | | | | 56K |
| | $P_1$ | | $P_2$ | | $P_3$ | | $P_4$ | | $P_5$ | | $P_6$ | | Cable |
| | | | | | | $P_1$ | | | | | | | 56K |

Fig. 8

METHOD AND SYSTEM FOR DYNAMICALLY INCORPORATING ADVERTISING CONTENT INTO MULTIMEDIA ENVIRONMENTS

BACKGROUND OF THE INVENTION

1. Field of the Invention

The present invention relates to advertising in multimedia environments and, in particular, to a computer system for dynamically incorporating content such as advertisements into multimedia systems.

2. Background

Advertising revenue paid by producers of goods and services helps fund broadcast, print, and other types of media. Advertising revenue can partially or completely underwrite forms of communication that otherwise would be cost prohibitive, or such revenue can even exceed communication expenses and generate profits. For example, the costs of running television and radio stations are largely paid by advertisers purchasing commercials for broadcast. This, in turn, allows multiple stations to compete in the market, providing increased selection for viewers and listeners. If advertisements were not part of the content delivered to consumers, far fewer television channels and radio programs likely would be available for the consumer to enjoy. The same holds true for magazines, newspapers, and other forms of communication.

Advertising on the Internet is still in its infancy, however certain guidelines exist. Oftentimes, pages on the worldwide-web include a "banner ad" section for advertising, which typically surrounds the pages "intended" content. Advertisements can be placed in this section by the page developer or by a third party. Typically, this type of advertisement is called a "click-thru" and, if a web user clicks the mouse while having the pointer on the advertisement, the user will be automatically directed to the site of the advertiser. These ads provide revenue to offset costs of producing and presenting the web page that is hosting the banner ads.

Advertising is so pervasive in our modern society that it has become part of our culture, and we have come to expect advertising in our lives. It seems out of place when it is not there. Examples of this can be seen in video games that attempt to present a real-world situation. Oftentimes, game developers will include advertisements in games, such as billboards placed in the outfield of baseball games, or advertising and signage in car road-racing type games. Occasionally an advertising blimp can even be found. These in-game advertisements improve the sense of reality in the game, thereby contributing to the life-like game experience. Sometimes a game manufacturer places advertisements for itself in these places. At other times, the manufacturer may actually create false or nonsense type advertising to maintain these life-like qualities of having advertisements in the games.

Placing static advertisements in or around video games is one known way to include advertisements. In addition to the above examples, where the ad images are "burned" into the game at pre-production time, other advertising techniques for video games are known. Some video games place ads in a border region around a game play window. If the game play window connects to the Internet, some portals contain the banner ads as discussed above or other types of advertisements. Another technique is to download ad images prior to game play, and then insert the downloaded ad into an "ad-space" specifically created inside the game to display the ad. An example of this technique can be found in U.S. Pat. No. 5,946,664 to Ebisawa. While these methods install ads in video games, they have inherent limitations. First, they distract from game play by either reducing the viewing area of the gaming experience; or by forcing the user to wait while ads are downloaded before game play begins. In the case of ads "burned into" the game code, they are incapable of being changed. Additionally, with the case of "burned" ads, there is no way for an advertiser to control their brand. There is no way to insure that their brand will be presented in a manner pleasing to them and no way to remove it from the game if they are dissatisfied with the brand placement or effectiveness.

As new games are developed and more game developers compete for the same game users, game developers strive to create the best gaming experience. These methods of enhancing the game experience come at an increased development price, however. If game developers continue to pass the entire cost of game development to the game users, many will not be able to afford to purchase the games. Additionally, some games can be played over the Internet. Some game companies charge a lower initial cost for a computer game, but then charge a subscription fee to play with others over the Internet. Many people using the Internet refuse to pay for subscription fees, and will be dissuaded from purchasing a game that forces them to pay subscription fees in order to play.

Currently there exists no way to provide computer content deliverers a non-intrusive mechanism for offsetting some of their development costs by placing advertisements within their content and receiving the advertising revenue therefrom.

SUMMARY OF THE INVENTION

Embodiments of the present invention provide computer-based methods and systems for providing a minimally intrusive mechanism that allows a content provider such as an advertiser to dynamically incorporate content, such as advertisements, into a video game or other target communication device or multimedia presentation. Example embodiments provide a dynamic inserter for enabling a player of a video game to experience advertisements incorporated into the game itself. These advertisements are dynamically updated as play progresses and may be incorporated into individual behaviors of objects within the game.

The dynamic inserter delivers ads to a game client system (typically via an ad client residing on the system) based upon a set of criteria, which may be specified by the advertisement providers, the game developer, the player, or some other combination. The game client system determines locations within the executing game where ads may be rendered and sends notifications to the dynamic inserter of these ad locations. Each ad location is associated with an ad tag, which is further associated preferably with one or more criteria, which are used by the dynamic inserter to select appropriate ads. The dynamic inserter provides ads to the game client, where possible, that conform to those notifications. Because available locations could dynamically change, delivered ads may no longer be appropriate or conform and the game client may choose to ignore them.

In one embodiment, the criteria associated with ad tags (and hence used by dynamic inserter to selects ads) include ad type, genre, and/or scheduling requirements. These criteria provide advertisers and game developers opportunities to tailor the ads to ensure that they are appropriate to the game and/or audience. In some embodiments, the dynamic inserter uses these criteria to select ads for delivery to the game client.

In some embodiments, game objects are programmed to have certain behaviors when interacting with particular ads or brands. In one embodiment, customizable ad types are used to dynamically extend behaviors of objects in the game. This provides a mechanism for developers to allow behaviors to change based upon branding. Once programmed to take advantage of extended ad types, game objects can extend their own behaviors automatically when ads that conform to these ad types are encountered.

In yet another embodiment, the effectiveness of the inserted ads, for example, quantity and quality of ad exposure, is measured by the game client system and notifications of these measurements are sent to the dynamic inserter for billing and/or other purposes. In some embodiments, the location of the player relative to the ad and the viewing angle of the player are measured. In other embodiments, the time a player is subjected to the ad is also measured. Additional qualitative factors can also yield subjective measurement values, such as the activity the player was engaged in at the time of exposure to the ad. Any one or more factors can be used alone, or in combination, or weighted in some manner, to achieve a measurement of the effectiveness of a particular ad.

In other embodiments, event notifications are sent to the dynamic inserter from the game client system to provide information on the ads rendered, ad locations available, billing information, and/or other events. These event notifications may be used by the ad server to schedule ads.

In some embodiments, the avatar of a player is used to heuristically target ads to particular players. Factors such as the gender of the avatar, age, aggressiveness, etc. are used to select ads that, based upon heuristics, will be more pleasing to players or more likely to generate revenue.

In one embodiment, the dynamic inserter comprises a game server, a game client system, and an ad server, each of which is connected to a communication network, such as the Internet. In some embodiments, the game client system further incorporates an ad client for managing communication with the ad server. In some other embodiments, a first communication link is made between the game client and the game server, which is used to provide a second communication link between the game client system (and/or the ad client associated therewith) and the ad server. In one embodiment the second communications link is a dribble pipe connection for continual delivery of ads, events, and other communication.

BRIEF DESCRIPTION OF THE DRAWINGS

FIG. 8 is an example chart of traffic that is scheduled by a process or thread running on an ad server.

DETAILED DESCRIPTION OF THE INVENTION

Figure 1A:
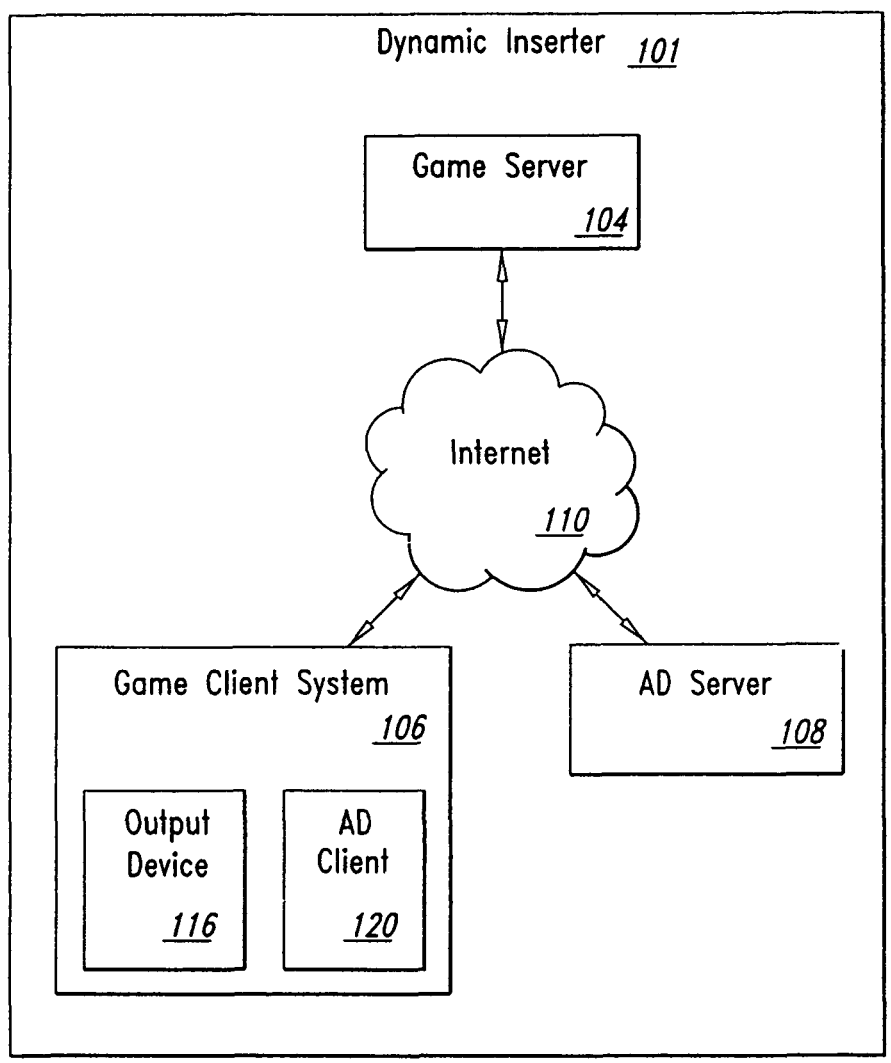
FIG. 1A is an example block diagram of an exemplary embodiment of the dynamic inserter of the present invention.

Embodiments of the present invention provide methods and systems for generating and dynamically incorporating content such as advertisements into multimedia systems, specific examples of which are computer game systems. Example embodiments of the present invention provide a dynamic inserter for enabling a user of a video game to experience advertisements within the game itself. These advertisements are dynamically updated as play progresses. For purposes of this invention, one skilled in the art will recognize that "advertisements" can include any type of media or electronic content including static or dynamic text, static or dynamic graphical images of any type, including animated images, web content such as html and xml code, other code, video and/or sounds or other audio content including, for example, speech and music whether streamed or downloaded. In addition, advertisements as used herein include any combination of media types, and may be compressed or raw.

In example embodiments, when a game client system is initialized, it establishes a communication channel with a game server. Once established, necessary game executables, code, and/or data is sent from the game server across the communication channel to the game client system to begin the game. Additionally in the game client system is an advertising client, which manages inserting the advertisements ("ads") into the game. Upon initialization, the advertising client connects to a dynamic advertising server, and establishes a second communication channel into the game client system. The advertising server maintains a collection or a list of dynamically modifiable advertisements for incorporation into the game. Upon the advertising client receiving an indication that an advertisement is needed in the game, the advertising client notifies the advertising server to request an advertisement. The advertising server, in turn, selects a particular advertisement from its collection according to a set of criteria, and sends that advertisement or an indication of that advertisement to the advertising client. The advertising client then provides the advertisement to the game software executing on the game client system, which inserts the advertisement into the game by displaying it on the screen, playing a sound over the speakers, or by some other method appropriate to the advertisement. In an alternative environment, the advertising server begins sending a set of advertisements to the advertising client immediately after the second communication channel is established, where they are stored, for example, by the advertising client until needed.

Embodiments of the present invention can be used with all types of gaming devices and systems, software or hardware that can establish a communication channel with the advertising server. For example, the game client system can run on a standard personal computer or dedicated game console connected to a network (e.g., the Internet) through narrow or broadband, DSL, ISDN, cable modem, satellite or other wireless network, etc. Additionally, it could be an arcade game likewise connected. Still another example is a hand-held game machine that can communicate to the advertising server by either a wired or wireless connection.

Although the present invention is discussed below specifically with reference to computer games, one skilled in the art will appreciate that the techniques of the present invention is useful in other contexts as well, such as dynamic insertion of ads and/or other content into hand-held communication devices. One example of such a system is a personal digital assistant, or PDA that communicates over a wireless communication channel. Another example is a telephone that supports text messaging or other data communication protocols, such as wireless application protocol (WAP). Still another example is a text or voice pager. Cost of use of such devices could be subsidized by advertisers paying for advertising directed to the devices. Also, the ads can be made much more effective to the recipient than standard advertising by using a system that can dynamically insert the ads in the devices and can tailor (or personalize) them to the users of such devices.

Another context in which the techniques described herein are useful is with respect to multimedia systems generally. One skilled in the art will recognize that these same techniques can be used to dynamically incorporate many types of content into an executing multimedia system. Such techniques could allow, for example, real time modification of a remote presentation.

FIG. 1A is an example block diagram of an exemplary embodiment of the dynamic inserter 101 of the present invention. The dynamic inserter comprises a game server 104, a game client system 106, and a dynamic advertising server, or ad server 108, each of which is connected to a communication network 110. In one instance, the communication network 110 can be the Internet and will be referred to as such for brevity, but could be any type of computer network, LAN, WAN, or wireless network, etc. The game client system 106 includes an output device 116 used to interact with a user of the game client system. The output device 116 could be a video display, audio apparatus, or tactile feedback device, for example. The game client system 106 also includes an ad client 120 that is used by the game client system to perform the dynamic insertion of ads into the output device 116, as discussed further below.

When the game user wishes to play a game, the user initiates a program, applet, or some executable code that runs on the game client system 106. That program establishes a game session with the game server 104 through the communication network 110. Additionally, a second communication channel is set up with the ad server 108, also through the communication network 110. Preferably this is a different channel than the one between the game server 104 and the game client system 106, thus allowing the game server 104 and the ad server 108 to be physically located at separate locales. The game server 104 transfers code, data, level plans or layouts and/or any other information necessary for the game client system 106 to initiate the computer game for the game user to play.

Figure 1B:
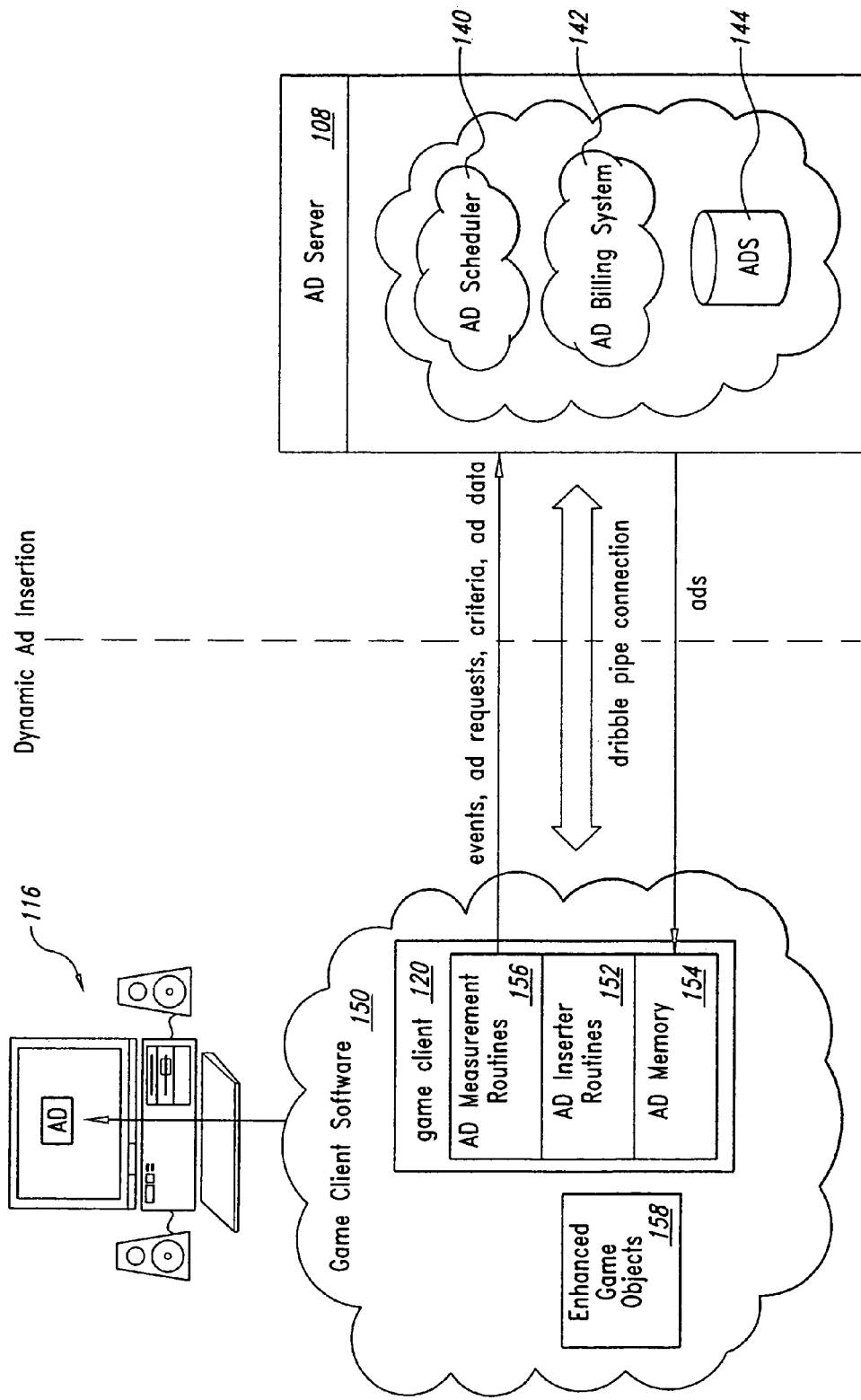
FIG. 1B is an example block diagram showing additional detail of interaction between the game client system and the ad server shown in FIG. 1A.

FIG. 1B is an example block diagram showing additional detail of interaction between the game client system 106 and the ad server 108 shown in FIG. 1A. Game client software 150 running on the game client system 106 includes a portion 152 dedicated to ad insertion routines, a portion dedicated to ad measurement routines 156, and a portion dedicated to memory for ad storage 154. The ad measurement routines 156 may be used to determine (and/or rate) ad exposure, including quality metrics, which can be logged and incorporated into a billing system. The client game software may also include enhanced game objects 158, which are game objects or components that have been modified to take advantage of branding, for example, to use brands to render enhanced powers or modified behavior to particular objects. This use of advertising is discussed further below. The game client system 106 communicates with the ad server 108 through a communication channel such as "dribble-pipe" connection, described below. This connection is a communication channel established between the game client system 106 and the ad server 108 and is used to request ads for display, send the actual ads, and send ad insertion logs and other data. The ad server 108 includes an ad scheduler 140 and an ad billing system 142, and is also connected to a database 144 that stores the advertising data.

In general, the game client system 106 uses the dribble pipe connection to request an ad from the ad server 108. The requested ad is sent back by the ad server 108 over the same dribble pipe connection. Once the ad is inserted into the output that is outputted to output device 116 (coupled to the game client system 106), the game client relays this information back to the ad server 108 to be stored therein. Information about the ad insertions is later used to generate invoices to advertisers, prepare insertion reports, and other uses. In addition, other types of information about the ads and/or other game parameters, retrieved from the ad measurement routines 156 or otherwise, may be relayed to the ad server 108 over the dribble pipe. Additional details describe the interaction between the game client system 106 and the ad server 108 in the figures and text below.

In one embodiment, the game running on the game client system 106 contains codes or tags that indicate that the game can accept an advertisement to be placed at a location within the game. For instance, the game may contain tags for a billboard on a side of a building in a city. As a game user directs the view of the computer game within the vicinity of the side of the building having the advertising tag, an ad, or code designating an ad, is requested from the game client system 106. If no ad are available locally, an ad is requested from an ad server 108. Once the ad is received from the ad server 108 (or retrieved locally), it is presented in the space indicated by the billboard tag and appears to the game user in the computer game as a billboard advertising a product. The actual insertion of the ad is performed by the game software itself, with coordination from the ad client 120 of FIG. 1A. Techniques for inserting downloaded ads into the game while executing on the game client system 106 are known and would be specific to the type of game being played. For example, inserting ads into a character role playing computer game may be different than inserting ads into a car road racing game. Thereafter, the game is responsible for outputting to the output device 116 the advertisement within the advertising billboard on the side of the city building.

Although referred to herein as "displaying" to the output device, one skilled in the art will recognize that the operation performed to output to the output device is dependent upon the device The term "display" is intended to incorporate all such meanings. For example, when sound is being inserted, the game software will "play" the sound on speakers.

Each game that uses the dynamic inserter 101 will have its own preferences for how advertisements are used and when they are requested, and these decisions will be made by the game developer. In order to create uniformity across the game developers using the dynamic inserter, a Software Development Kit (SDK) can be distributed to the game developers to provide tag and event management. Then, as the games are being designed and coded, standard routines can be used to create a tag that indicates an advertisement may be placed at a particular tag location. Additionally, template code to display the advertisement once it is received from the ad server can be included in the SDK, thereby making the dynamic inserter as easy as possible to be included in many different video games.

In addition to the game client system 106 requesting an advertisement from the ad server 108, one skilled in the art will recognize that there are many ways to perform dynamic insertion of advertisements into a video game or other multimedia system. For one example, some advertisements may be already stored in the game client system 106 prior to the initialization of the game client system. Then, as the game progresses on the game client system, codes are sent by the ad server 108 that specify which stored advertisements are to be inserted in the gamespace. A further modification is that the game server 104 may not be constantly connected to the communication network 110, but rather may be only used for initiation of the game client system 106, or may not be present at all. For example, standalone type machines such as Playstation 2 by Sony, Inc. or Xbox by Microsoft, Inc., may not connect to a game server, but rather have all of the programs and data necessary for play already included in them. In a preferred embodiment, the dynamic inserter 101 contains a game server 104 that can be coupled to the communication network 110, but the game server need not necessarily be connected for all embodiments of the invention.

Figure 2:
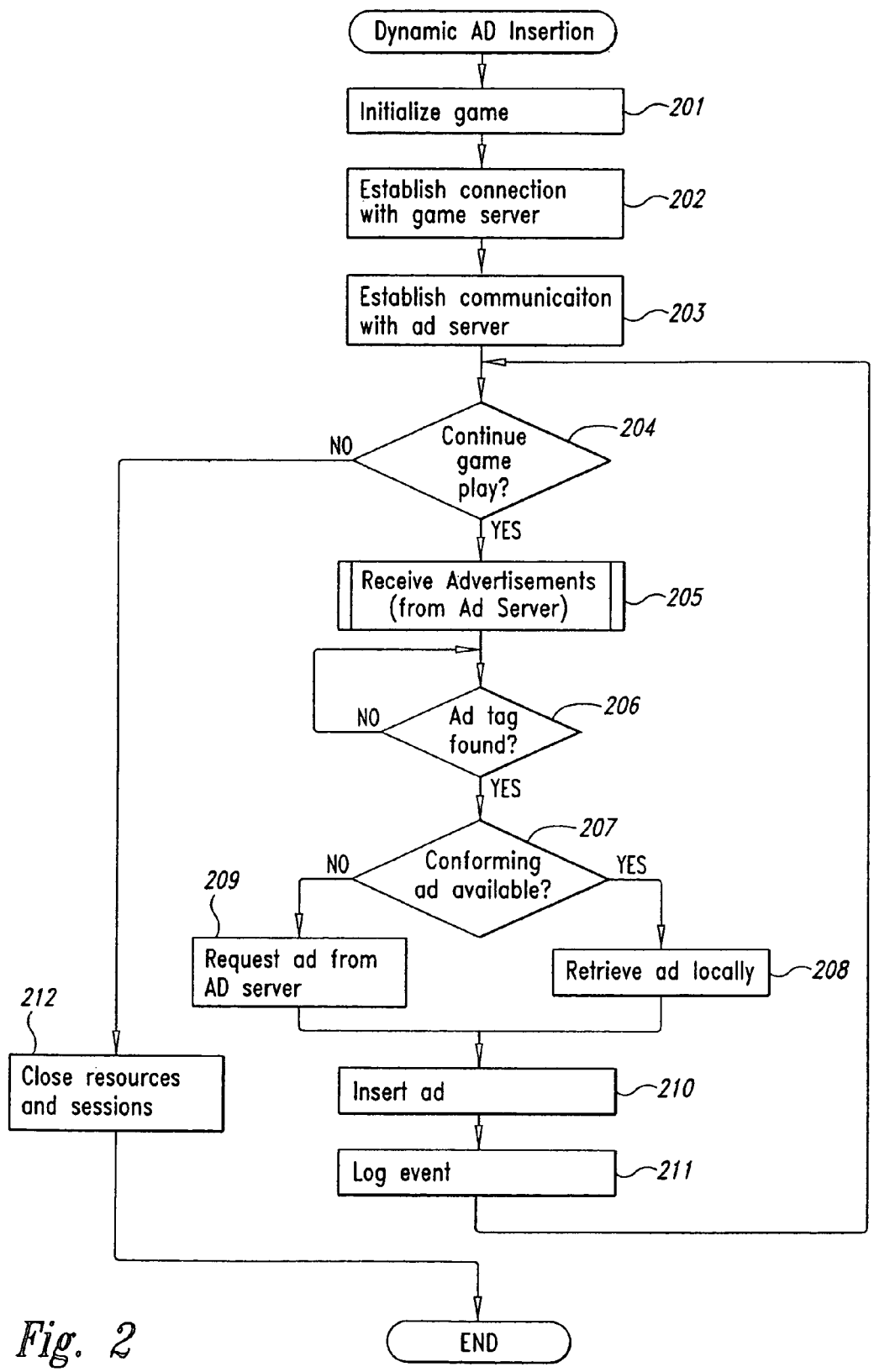
FIG. 2 is an example flow diagram of the dynamic insertion of advertisements process from the point of view of a game client system.

FIG. 2 is an example flow diagram of the dynamic insertion of advertisements process from the point of view of a game client system. Although the steps are shown in an example order, one skilled in the art will recognize that other orders of these steps are operable with embodiments of the present invention and that multiple threads of execution may be appropriate depending upon the actual implementation. Further, additional steps can be included or some steps omitted, yet similarly achieve the techniques of the present invention.

In step 201, a user (or automated client) playing a game, or some other action into which dynamic content will be delivered, initiates the executable on the game client system (e.g., game client system 106). In step 202, the executable establishes a session or other type of communication connection with a game server (e.g., game server 104). In one embodiment, the host or game server is a game machine that manages playing video games over the Internet. A popular type of Internet video game is called Massive Multiplayer Role Playing Game (MMRPG). In these games, thousands of players, each having their own Internet connection, interact on a world server or set of servers. Players can see and interact with one another and with the machine controlled characters, such as monsters and other permanent characters, etc., that are in the game. Some of the more popular MMRPGs are Ultima Online by Electronic Arts, Inc., Everquest by Sony Online Entertainment, Asheron's Call by Turbine Games, and Halflife by Valve. Typically in these type of MMRPGs, a game player using a game client system logs into a network (e.g., the Internet 110) and then initiates a session or other type of communication between the game client system and the game server. The game user may log into the game server with an account and password that uniquely identifies that player, for example. This method or any similar connection method is indicated by the step 202 in FIG. 2.

Typically Internet games require a lot of bandwidth, or data transfer capacity between the game server and the game client system. This bandwidth is used for many things. For example, it may be used for sending scenes or new levels to the game user. Additionally it may be used to send data or codes about other players on the Internet that are virtually recreated on the game client system. For instance, consider just two players, A and B, simultaneously playing on a MMRPG. When both player A and player B are playing, data about player B must be sent to player A's game client for A's game client system to create the virtual player B. Data about player B's movements, appearance, arsenal, abilities, etc., is sent to player A's game client system over the communication network, and the same information about player A is likewise sent to player B. Because generally the game is enhanced by data being sent from the game server to the game client system, the bandwidth of that connection should preferably be as large as possible.

The total bandwidth to a user of a game client system can be defined as the amount of data per unit time that can pass between the game client system and the communication network. The bandwidth available to the game user depends on how the game client system is connected to the Internet. Many ways to connect the game client system to the Internet are possible. A common method of connection is a modem using a telephone line. Present day modems connect at a rate of up to 56 Kbps, although the actual connection speed over a telephone modem is usually lower, somewhere around 35-48 Kbps. Also, this connection speed represents the total amount of data that can be passed between the game client system and the connection network, and does not factor in the large overhead of the protocols and transport mechanisms necessary for communication. The actual useable data, after it has been removed from the data portion of the protocol packets, and after factoring things such as lost packets necessitating a re-send etc., will have a much lower throughput rate, like 1-5 Kbps. However, because the actual data throughput is hard to predict due to the many different factors, and the actual data throughput should scale relatively linearly with respect to connection speed, bandwidth is discussed herein generally in terms of connection speed of the game client system to the communication network.

As mentioned above, varying methods of connection to the Internet yield different connection speeds. One of the slowest, as mentioned above, is a telephone modem. Also available are various forms of Digital Subscriber Link (DSL), generally having connection speeds of 1.5 Mbps-8 Mbps (or up to 56 Mbps for VDSL), various "direct" connections to telephone companies via a LAN or WAN, such as T1 (56 Kbps-1.54 Mbs) and T3 (3 Mbs-45 Mbs), and various cable modems, with connection speeds of 500 Kbs-10 Mbps.

In step 203, the game client system establishes communication with the ad server (e.g., ad server 108). Preferably this communication channel is separate from the one established in step 202, thereby allowing the ad server to be physically and/or logically separate from the game server. In one embodiment, the communication channel can be established through a connectionless User Datagram Protocol (UDP). UDP is well known to one skilled in the art and is described in RFC 768 of the Internet Architecture Board. Many references exist. Packets conforming to the UDP protocol will be sent over the communication network from the game client system to the ad server and vice versa. Data sent from the ad server may include advertising data, codes, binary files, web content, event notifications, billing data, and other information as described below. It also may contain scheduling directions for when the advertisements are to be inserted into the game. Additionally, it may contain coded descriptions or indications of the ads sent, so that the game client system can identify where to place the ad. For instance, one type of ad could be a hanging sign advertisement. The type and genre of the advertisement could affect where the ad is placed within the game. For example, signs indicating sporting goods, such as NIKE shoes or HEAD tennis rackets may be out of place in a tavern generated in the MMRPG, while an ad for BASS ale may be out of place in a generated department store. By identifying not only the type of ad, but also the genre of ad, advertisements can be placed in the virtual world of the video game with much more realism and targeted to or restricted from users selectively. A detailed discussion of the types and genres of advertisements follows below.

Communication between the ad server and the game server can be specifically tailored to be nearly "invisible" or unnoticed by the game user. However, the connection between the ad server and the game client system must be present to schedule and/or deliver the ads that will be dynamically inserted into the game client system. In order to be remain unnoticed by the game user, the connection between the ad server and the game client system should be minimally and continually intrusive. That means that a certain small slice of the total bandwidth available between the game client system and the communication network should be allocated to the communication between the game client and the ad server. By using the aforementioned UDP protocol, these goals can be achieved. UDP is preferable to the more ubiquitous TCP/IP, because the former is connectionless, and the built in sequencing and flow control of the latter could potentially could cause data bursts that are detectable by the game user as a slowdown of the user's game. One embodiment uses UDP to send small data packets that are precisely timed, to avoid saturation of the UDP connection and remain invisible to the game user.

In a preferred embodiment of the invention, the ad server will continually send UDP packets to the game client system, and the game client system will continually send UDP packets to the ad server. In this way, the game user will never realize that a portion of the user's bandwidth is unavailable for the game server. For example, game play on the game client system will not slow down while an advertisement is being sent from the ad server to the game client system, and then later speed up when the ad is completely downloaded. Establishing how large the communication channel between the ad server and the game client system as a portion of the total bandwidth will be discussed with reference to FIG. 8. Generally, however, this connection between the ad server and the game client system is a relatively small portion of the total bandwidth available to the game client system. Therefore, this connection between the ad server and the game client system is referred to as a "dribble pipe", to denote that the data transferred is small compared to the data transferred between the game server and the game client system.

Referring back to FIG. 2, step 204 performs a check to see if the game user wants to play or continue to play a game. As long as the game user is playing the game on the game client system, step 204 will be exited in the affirmative direction to step 205. In step 205, advertisements are sent from the ad server and are downloaded via the dribble pipe connection. In actuality, this "step" is ongoing and occurs during the entire time that the dribble pipe connection exists (is live) between the ad server and the game client system. In some embodiments, a dribble pipe connection can be executed as a separate thread of execution. In step 205, the ad server sends graphics or other ad data that will make up the actual ad to be displayed on the game client system along with other data, such as scheduling data through the UDP packets over the dribble pipe. The game client system assembles the packets into the predetermined ad format, such as a graphic and stores the assembled ad locally. The other data sent by the ad server is likewise stored. Alternatively, in order to further minimize the scarce bandwidth resources of the dribble pipe, the data making up the advertisement to be placed in the game may be compressed prior to dividing it up into UDP packets and placed on the dribble pipe. The advertisement, once received by the game client system, may be uncompressed prior to storing it in the client system memory, or the ad may remain in the memory of the game client system in its compressed format and decompressed only when actually being placed into the game. If the ad graphics are compressed or otherwise coded, they will need additional memory in the game client system for the decompression/decoding. Ad encryption can be handled similarly. The assembled ad, in either its compressed or uncompressed state, may be stored in memory of the game client system, or it may be cached out to another type of storage, such as a hard drive or other non-volatile storage. Some game client systems may not allow a game to access the secondary storage, or others may not even include any secondary storage. For example, a console game system typically does not contain a hard drive, nor does a hand-held game or computer system. In these cases, if the storage capacity of the portion of the memory of the game client system that was allocated for storing advertisements has been exceeded, additional data received from the ad server is simply discarded, or the ad server is appropriately informed and can choose to change its delivery schedule.

In step 206, the game checks for the existence of an advertising tag. An advertising tag, as described above, is a code or other indicator that indicates an advertisement could be placed in a particular location of the game. The tag could have been generated based on information stored in the game file on a hard drive or other storage of the game client system, or could have been included in the data sent by the game server to the game client in step 201 or 202. If no advertising tag is found in step 206, the game client system continues checking the game for advertising tags. (In an alternative embodiment, a separate execution thread is launched to check for advertising tags. When one is found, the dynamic inserter is notified.) When an advertising tag is detected in step 206, the game client system checks in step 207 to see if it is already storing any ads available and appropriate to be placed in that location. In order to determine when a particular ad can be placed in the location or on the object that corresponds to an advertising tag, different criteria are used. The exact criteria examined are customizable and dependent upon the type of game and the advertisers. In certain scenarios some criteria may be relevant while others not. In one embodiment, three important criteria that are examined for appropriateness prior to inserting an ad into a particular advertising tag location are ad type, ad genre and ad scheduling time. The type of the ad relates to its format. For instance, some of the formats of ads can include static images, animated or dynamic images, HTML or other programmatic codes, and audio or video files. The audio or video files can either be downloaded in whole or in a streamed format. Additionally, each ad stored in the ad server is associated with a genre, even if the genre is universal. For instance, one genre may be sports related, and another may refer to alcohol. Ads that correspond to the sports genre may be placed in a school generated in the game, while the alcohol genre ads may not be (for many reasons, including convention and legal). Further, each ad has associated scheduling information that prescribes when the advertisement can be placed in the game. For example, an advertiser may want their advertisements only to appear on weekends, and not during weekdays. The scheduling information about that advertisement would instruct the game client system only to insert that ad during the allowable scheduled times.

Determining, in step 207, if a given advertisement conforms to the type specified in an advertising tag found in step 206 involves comparing the type or types associated with the advertisement to the type or types associated with the particular ad tag. Preferably, each ad tag within the game is associated with an object in the game. For example, an object could be a billboard on a building, a sign on a bus, an emblem on a hat or other clothing, a loud speaker that is actually producing sounds within the game, a scrolling message board such as in Time Square in New York City, or any other type of advertisement that may exist in the real world and is represented in the game world. As mentioned above, ad tags are preferably associated with at least some of the objects in the game, typically in a one-to-one relationship, meaning that each tag in the game is associated with one object. Many of the objects in the games will not have advertising on them, and therefore will not have ad tags associated with them, trees or fire hydrants, for example. When an ad tag is found in step 206, the object to which it is associated will be identified by the ad type. For example, step 206 may find an ad tag that is associated with a logo on a baseball cap. The ad tag may be a code that specifies the relative dimensions of the ad, or be an indication of the type of object (clothing) or specific object (hat), or some other indication. Step 207 will then examine the inventory of stored advertisements in the game client system, if any, to determine if any of them match the type code of the found ad tag. If one or more advertisements are found, then those could be selected as conforming ads.

Determining whether the genre of an advertisement matches that of a found ad tag involves comparisons similar to those described above with reference to ad type. Each ad tag within the game executing on the game client system preferably contains a genre specification. A genre specification may be the same for all of the ad tags found throughout the game. For instance, game developers may decide that no advertising in a game designed for children should allow adult natured advertising, e.g., involving alcohol or firearms. A genre could be specified that indicates the preferred age range for the advertisements placed at the location linked to the ad tag. For example, a genre type "A" may indicate advertising is appropriate for all ages, while genre type "B" is only suitable for adults. When a particular ad tag is found in step 206, the genre of advertisements stored or indexed within the game client system would be checked against the genre in the found advertising tag to determine if they match. Or, for example, the game developer may desire to give the game user control of the scheduling of certain ad genres. For example, the user may like to control what is seen by other users using the same gaming device (e.g., the user's children). Extensions of the present embodiments may be provided, using for examples, routines of the SDK, that allow the game user to specify scheduling criteria held in a preferences table, which could be used to control the genres in the advertising tags (and subsequently in the ads that are served by the ad server). In this situation, when an advertising tag was found, the program could check the preference table and assign the prescribed genre to the ad tag.

In addition to checking to see if the types and genres match, step 207 will check to see if the scheduling requirements for the advertisements and the located ad tag match. As mentioned above, each advertisement has scheduling data that describes when the ad should preferably be inserted in the game executing on the game client system. The scheduling data may indicate that there are no restrictions on when the ad can be placed into the game, or the scheduling data may tightly control when the advertisement can be placed. For instance, an advertiser may only want an advertisement placed into the game if it is after 10:00 pm local time. Determining the local time of the game client system may be as simple as checking the system time run by the operating system, or a lookup of the IP address could indicate the general physical location of the server to which the user is connected, which could also indicate the local time. Therefore, prior to insertion into the game on the game client system, a function is called to preferably ensure that the schedule is met. The scheduling need not be limited to time and date restrictions, but are only given by way of example. For instance, an advertiser may wish that a certain series of ads are seen by the user in a particular order. The game client system could insure that prior to inserting the second advertisement in the series into the game, that the first advertisement of the series was already inserted.

Therefore, at least the type, genre, and scheduling time associated with the ad preferably identically or closely matches the codes associated with the advertising tag for it to be considered an "available" ad for the purposes of step 207.

If step 207 determines that there is a conforming ad available in the game client system, the ad is retrieved from the game client system in step 208 and awaits to be inserted into the game. If, however, step 207 determines that there are no conforming ads present in the game client system, the game client requests a conforming ad from the ad server in step 209 by sending information to the ad server describing the ad specifications that is specified by the tag found in step 206. Once the ad server receives the notice, it will begin sending an ad conforming to the desired ad specifications (e.g., type, genre and scheduling time) to the game client system, in a manner further discussed with reference to FIG. 4. Once the conforming ad is downloaded from the ad server, it will be re-verified that it conforms to the advertising tag found in step 206, and then await insertion into the game.

In step 210, the dynamic inserter formats and places the conforming ad that was retrieved in either step 208 (if an ad was available locally) or step 209 (if the ad was specifically requested from the ad server) into the game in the location that corresponds to the advertising tag found in step 206. Formatting a stored ad for insertion into the video game may be performed by calling functions or an application programming interface (API) provided in the SDK that was used to develop the game client system. Some of the functions may include de-encrypting the stored ad either at this step or when it was stored in the memory of the game client system, or decompressing the ad that was compressed for transmission from the ad server. Further, if the ad server is merely sending a pointer or some indication of an advertisement already stored within the game client system, one of the functions may be to retrieve the previously stored advertisement prior to formatting it for insertion into the game in step 210. An exemplary system using this method could be a paging system, where text messages are pre-stored in non-volatile memory of a pager, and the ad server sends a wireless notification to the pager to insert the message stored at memory location "x". The corresponding message would then be retrieved, decoded, and displayed. Many other examples can be implemented with little or no experimentation by one reasonably skilled in the art.

It is possible that, even after an ad has been requested to be placed in the game executing on the game client system, the game refuses to display the advertisement. For example, the game may refuse to insert an advertisement on an object that is currently in view, and may force the game client system to wait until the advertising tag again goes out of view prior to inserting the ad. Further, the game executing on the game client system may only allow ads to be inserted during a level change, or some other break in the game. In that instance, the ad insertion would be queued for execution during the level change, and all of the ads for the new level formatted and inserted at the same time. Additionally, the game running on the game client system may refuse to accept an advertisement when the advertising tag was already hosting another ad, and would force the game client to wait prior to the new insertion. One skilled in the art will recognize that many such variations are possible and contemplated by embodiments of the present invention.

Another reason that the game may refuse to display an advertisement is because the ad tag found in step 206 is no longer "active" in the game view (the portion of the world being currently viewed in the game). Specifically, because the world in which the game players play may be continuously changing and all of the objects of the game may not always be in view, tags found in step 206 may not be currently active by the time the dynamic inserter is ready to insert the ads in those locations. Thus, preferably, a list of all of the active advertising tags is stored on the game client system and can be transferred to the ad server. The list may include those advertising tags that correspond to locations that are currently shown in the game, as well as those recently shown, and may even include a list of any tag found in step 206 during the entire game.

Figure 3A:
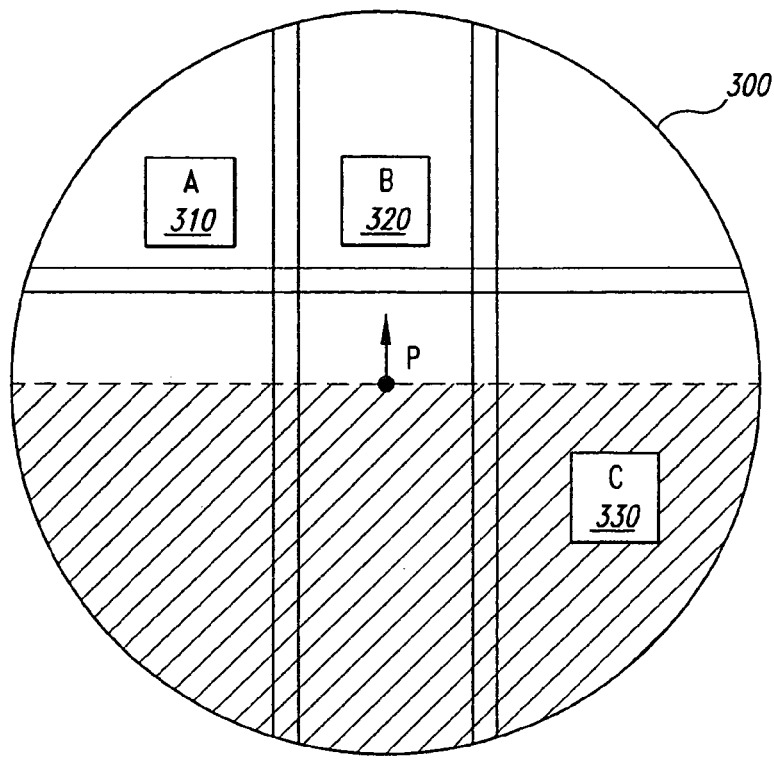
FIGS. 3A and 3B are block diagrams of field of views in an example video game.
Figure 3B:
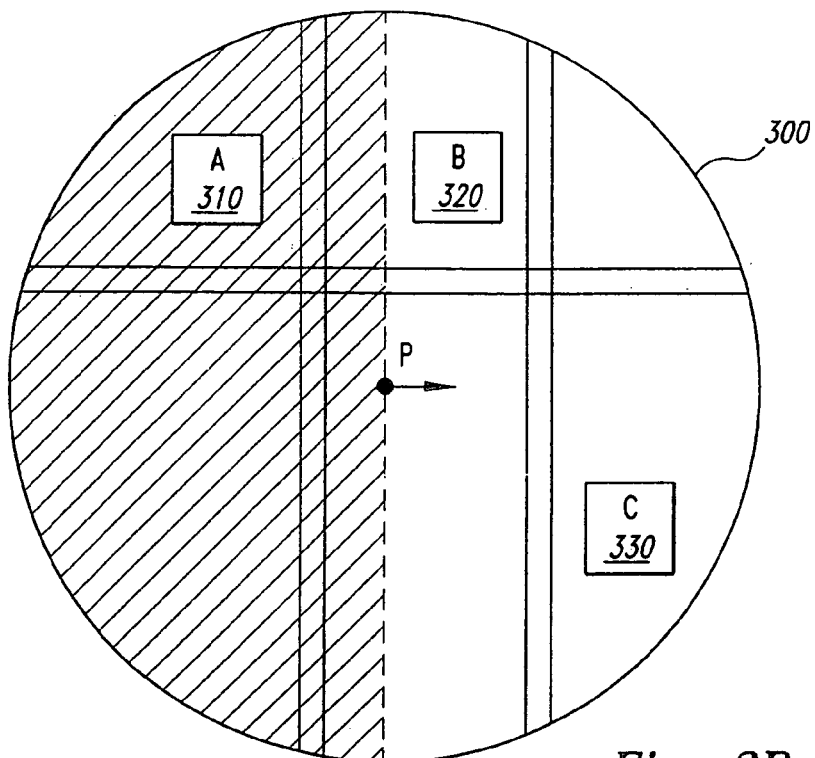

For example, with reference to FIG. 3A, shown is an example world 300 to a video game. In this small world 300, three buildings are present, Building A 310, Building B 320, and Building C 330, each having a unique type advertising tag attached to at least one of their respective sides. A player P standing in a location near the center of the world 300 looks in the direction of the indicator arrow. In this example, the player P has a "field of view" of 180°. In FIG. 3A, the player P can only "see" the buildings A 310 and B 320, and therefore the tag types associated with these buildings will be in the list of all active advertising tag types. At this point in the game, the player P cannot see building C 330 because it is behind the player's field of view. If the player P turns to the right, however, as shown in FIG. 3B, the player P now sees the locations that correspond to advertising tags for the buildings B 320 and C 330, but not for building A 310. Therefore, the current advertising tag types for the player P in the FIG. 3B would include those attached to the buildings for B 320 and C 330, while the recently used advertising tag types would also include the building A 310.

Returning back to FIG. 2, it is easy to imagine a case where a player sees the location or object that corresponds to an advertising tag in the player's field of view and then quickly turns so that the advertising tag's location is again out of view. In this situation, the following steps likely would take place: find an advertising tag in step 206, determining that no conforming advertisement was currently available in the game client system in step 207, and requesting a conforming advertisement from the ad server in step 208. But, after the ad server begins downloading the requested conforming ad, the player turned and the advertisement is no longer immediately needed by the game client system. In this case, the advertising tag found in step 206 may no longer be in the currently shown tag list, but would exist in the recently used list of tags. Preferably, given this situation, the ad server would continue downloading the ad to the game client system, even though the ad is not currently needed. Continuing to download the ad would create further efficiencies because, in some games, it may be highly likely that the player may turn again, causing the ad tag to be again detected and an ad that satisfies the criteria of the tag to be quickly found. If instead the downloading from the ad server was simply stopped once the advertising tag was no longer in the currently shown tag list, the ad may be requested many times as the player turns and moves, only to be thrown away each time.

Following insertion of the advertisement into the game in step 210, the insertion event or the request to the ad server in step 209 is logged by sending the information about the ad placement back to the ad server in step 211. It is important that the game client system communicate this information back to the ad server, because the insertion is at least one event that preferably will be paid for by the advertiser. In addition, other information regarding measuring the player's exposure to the ad and the quality of that exposure may be communicated back to the ad server for billing and other purposes. In logging the insertion, as much information as possible regarding the event is preferably sent back to the ad server, such as advertisement identification, target tag identification, user, date, time, etc. This information can be stored in a backend database associated with the ad server and mined by the advertisers or others to provide useful information from the patterns that emerge. Additionally, the game client system can determine duration of the advertisement (how long the inserted advertisement was displayed) and a measure of the quality of the exposure. The quality of the inserted advertisement may not be the same in every game, and indeed, each insertion may be different. For instance, an ad may be inserted in the game, but at a location far from the game player, and the game player may not be able to see the ad very well, or the ad may be presented at a 45° or some other degree angle away from the game player, yielding a less than optimal quality measurement. Alternatively, the game player may be "standing" directly in front of the inserted ad so that it takes up 75% of the user's available screen. This last ad insertion could be very valuable to advertisers, who may be willing to pay a premium for such treatment. Again, alternatively, the game player may speed past the ad, such as when driving a race car past a road sign. In this case, an advertiser may wish to pay less than the prior case where the player stood in front of the ad. The ad measurement routines 156 of the ad client 120 can be used to collect and transmit such information to the ad server.

At a minimum, the data about the ad insertion by the game client system that is sent to the ad server preferably includes an identification of the user, which could be a unique user ID generated when the dribble pipe was established, or perhaps a login identifier gleaned from the game server, or the IP or other address of the game client system. Additionally, the game client system would specifically identify the ad that was inserted. The duration of the ad insertion would also be included in the event log, as well as an indication of the quality of the insertion, as discussed above, such as viewing angle, position relative to the object, etc. The last two data points (duration and quality) may be combined to create a "pixel-hours" type number, where the total number of pixels making up the inserted advertisements could be counted or calculated, timed, and multiplied to form a rough indication of overall ad insertion exposure. This combined data would be more useful than simply listing the number of ad insertions, because of the possible quality issues described above. For example, if there were a large number of ad insertions at a "distance" from the game user (such that they appeared very small on the user's screen), these may be roughly equal to only a few ad insertions that appeared larger on the user's screen. Pixel-hours is a way to average all of these events to get an overall sense of the game user's exposure to the inserted advertisements. Another way to reflect the exposure of the advertisements displayed in the game would be to set a minimum time and screen size to qualify as an ad "hit." For example, each time an advertisement takes up 3% of the users video screen for 3 seconds it would be classified as a 'hit', then the number of hits per game could be counted and sent to the ad server in the event logging step 211. Alternatively, the ad client 120 might implement a weighting scheme, where certain relative positions and view angles are weighted higher than others. One skilled in the art will recognize that other types of quality measurements and combinations of ratings are possible.

Different mechanisms may be used by the game client system (and/or ad measurement routines 156) to measure ad exposure quantity and quality. Preferably, since a client game already needs to track position of the player relative to each object and the distance of the player from the object, these same techniques and/or measurements can be used. Typically, these mathematical and heuristical techniques are known in the art for determining what objects are to be displayed (or eliminated from display) when the player changes his/her game view. For example, these techniques are used to avoid painting objects on the output device that are outside the player's viewing range. Building C 330 in FIG. 3A is an example of such an object within the depicted scenario. In the ad insertion scenario, these same techniques can be used to supply the quality and quantity of ad exposure. Example techniques include: use of a frustum model (e.g., a view frustum), trigger maps, and hit testing based upon geometry divisions of the display screen. Alternatively, code can be added into each player instance to track needed movement information, which is then translated for its effect relative to the ad. Also, ads can be dynamically "wrapped" with code to measure their view of each player. One skilled in the art will recognize that techniques for measuring point of view and exposure in other 3D virtual worlds can be similarly extended to measuring the effectiveness of inserted content.

Because of the bandwidth limitations on the dribble pipe, the data collected for event logging to the ad server in step 211 may need to be locally buffered on the game client system prior to sending. After an event is logged in step 211, the process flow then returns to step 204, where it is determined whether the game will continue. If the game player decides to continue, the dynamic ad insertion process continues to step 205 to process ads. Otherwise, the ad insertion process continues in step 212. In step 212, the session established with the game server is closed, such as by logging out of the game server, or the game server may eventually realize that the game client system is no longer communicating with it and will automatically shut down the session. In addition, the dribble pipe connection between the game client system and the ad server will also be eventually shut down when the ad server receives no responses to the UDP packets it sends to the game client system.

Figure 4:
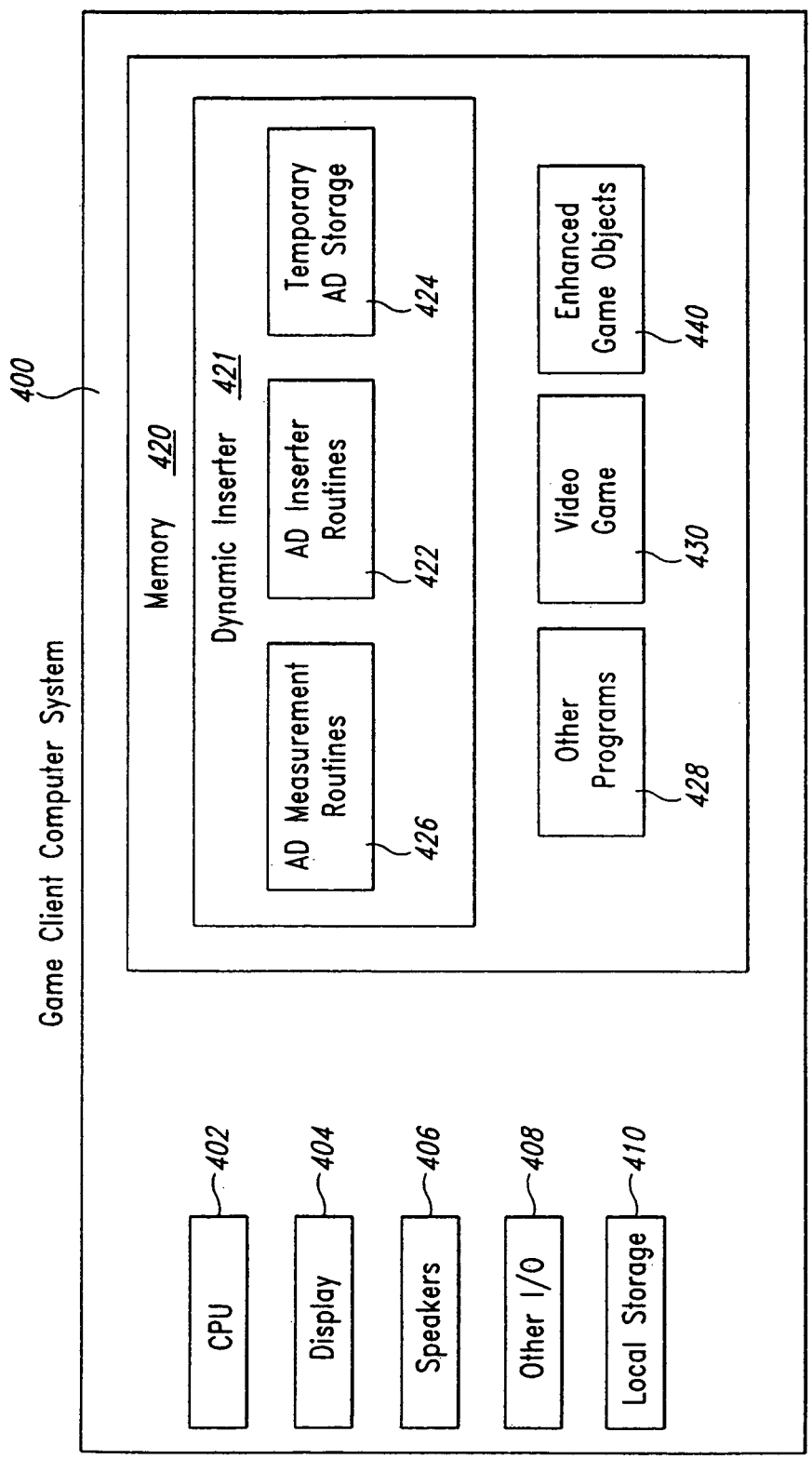
FIG. 4 is a block diagram of a general purpose computer system for practicing embodiments of a client portion of the dynamic inserter.

FIG. 4 is a block diagram of a general purpose computer system for practicing embodiments of a client portion of the dynamic inserter. Specifically, the block diagram of FIG. 4 shows a computer system that performs as a game client system. The computer system 400 includes a central processing unit (CPU) 402, a display 404, an audio output 406, a local storage device 410, as well as other input/output devices 408. The computer system 400 also includes a computer memory 420. Components of the dynamic inserter 421 typically reside in the computer memory 420 and execute on the CPU 402. As described with reference to FIG. 2, the portion of the dynamic inserter that runs on the game client system includes ad inserter routines 422, and may optionally include ad measurement routines 426 and temporary ad storage 424. Additionally, a video game 430 or some other executable program also resides in the computer memory 420 and executes on the CPU 402. Also, in some embodiments enhanced game objects, such as enhanced game objects 158 in FIG. 1B, reside in the computer memory 420 and execute on CPU 402. Other programs 428 also may reside in the memory 420. One of the input/output devices 408 is the connection means, such as a modem or other hardware that allows the computer 400 to connect to the communication network. One skilled in the art will also recognize that exemplary dynamic inserters 421 can be implemented as one or more code modules, may be implemented in a shared environment with multiple displays 404 coupled to the same computer memory 420, or may be implemented in a distributed environment where one or more of the components reside in different locations. In addition, one skilled in the art will recognize that the components of an exemplary dynamic inserter 421 may be combined or that additional components may exist.

Figure 5:
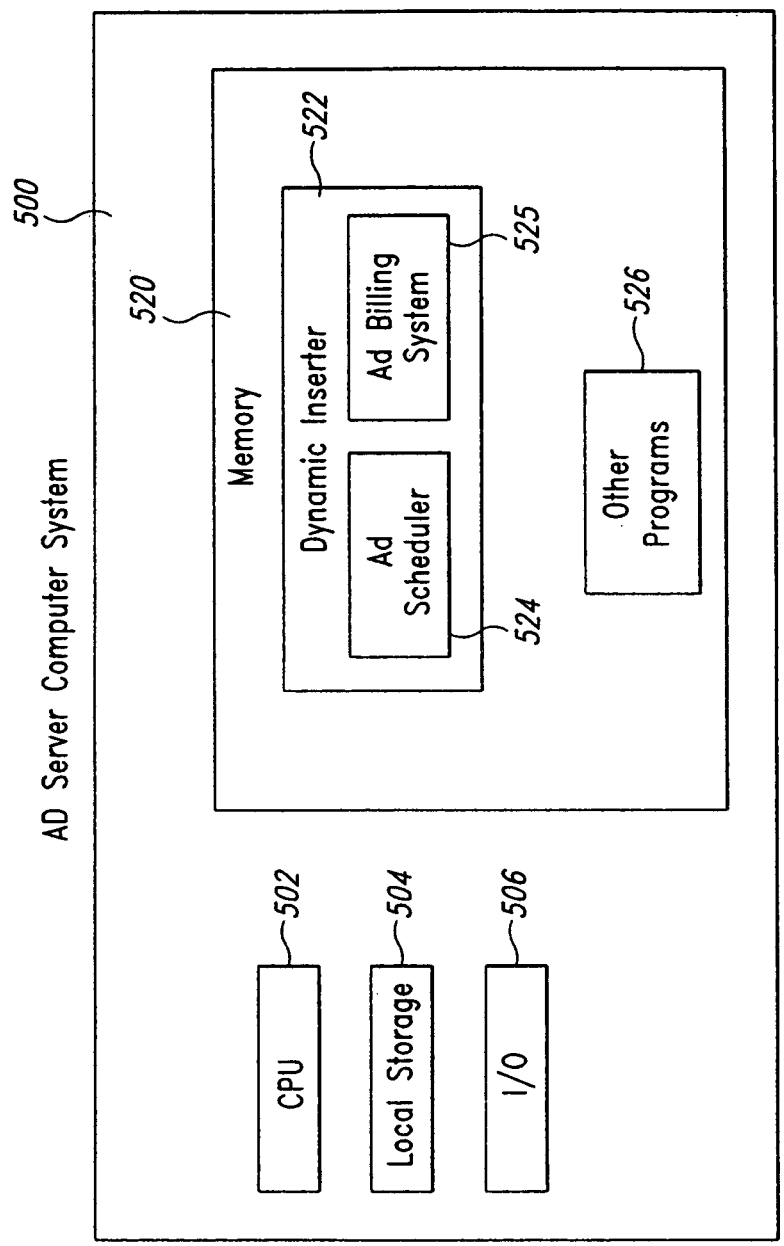
FIG. 5 is a block diagram of a general purpose computer system for practicing embodiments of a server portion of the dynamic inserter.

FIG. 5 is a block diagram of a general purpose computer system for practicing embodiments of a server portion of the dynamic inserter. Specifically, the block diagram of FIG. 5 shows a computer system that performs as an ad server and ad scheduler. The computer system 800 includes a central processing unit (CPU) 502, a local storage device 504, as well as other input/output devices 506. The computer system 500 also includes a computer memory 520. As described with reference to FIG. 1B, components of the dynamic inserter 522 typically reside in the computer memory 520 and execute on the CPU 502. The ad scheduler 524, for example, could be a program or process that is used to select and schedule to be transmitted to the game client system. Alternatively, the ad scheduling function may be a separate component from the ad selection function, so that they can operate in a more concurrent fashion with game client system 106. Optionally, the dynamic inserter portion 522 present on the ad server includes an ad billing system 525 for processing logged billing information, and potentially automatically interacting with billing infrastructure of advertising companies. Other programs 526 also may reside in the memory 820. One of the input/output devices 506 would be the connection means between the ad server and the communication network, such as a network card coupled to a LAN and to a T1 connection.

One skilled in the art will recognize that exemplary dynamic inserters can be implemented as one or more code modules and may be implemented in a distributed environment where the various programs residing the memory 520 are instead distributed among several computer systems. Similarly, one would recognize that many general purpose computers 500 could be interconnected to make a single ad server.

Figure 6:
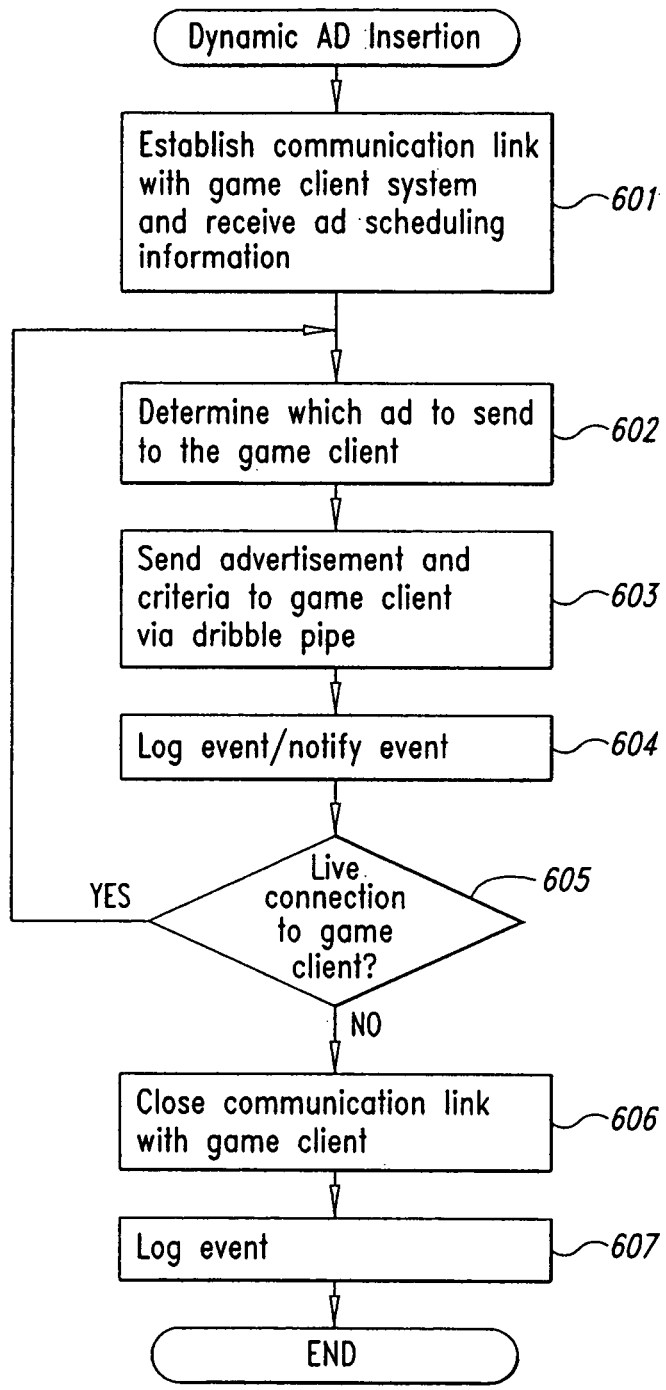
FIG. 6 is an example flow diagram of the dynamic insertion of advertisements process from the point of view of an ad server.

FIG. 6 is an example flow diagram of the dynamic insertion of advertisements process from the point of view of an ad server. Although the steps are shown in an example order, one skilled in the art will recognize that other orders of these steps are operable with embodiments of the present invention and that multiple threads of execution may be appropriate. Specifically, in step 601, a link is established between the ad server and the game client system. In step 602, an ad scheduler (such as scheduler 140) that resides in the ad server determines which ad should be next sent to the game client system. The ad scheduler can select the next ad based on criteria provided by the game client system, or can make the determination itself. In step 603, the selected ad is sent to the game client system through the communication link established in step 601, and, after the ad is inserted into the game on the game client, the ad insertion event is logged in step 604. Step 605 determines whether data is still being sent from the game client system. If so, the process loops back to step 602 and another ad is selected to send. If, however, the game client system is no longer connected or responding to the ad server, the communication link is closed in step 606, and this event is logged in step 407.

Discussing the above steps in more detail, in step 601 the ad server, such as ad server in FIG. 1A, receives an indication to establish the dribble pipe connection with a game client system, such as the game client system in FIG. 1A. Communication with the game client system is established as described above, for example, with reference to step 202 of FIG. 2. Initially, and after having been authenticated by the ad server, the game client system sends information about itself. In addition to its IP address and the type of game being played, some of the information sent by the game client system could include, for example, the size of memory available for storing and decoding advertisements, the size of memory available for storing other data relative to the advertisements, the speed of the game client system's connection to the Internet, and, optionally, a list of the types and/or genres of ads that can be inserted into the video game. Providing a list of the types and/or genres that are acceptable to a game running on the game client system may be done during step 601, or the type/genre of one particular ad can be sent as part of the advertising tag that is found during the play of the game, as described below. It is useful to send the list all at once in step 601, however, because the ad server can then better tailor what is sent to the game client system via the dribble pipe. Alternatively, this information can be stored solely on the client side and non-conforming ads merely discarded. The list of types and genres of ads that can be inserted into the video game can be derived from the list of ad tags that are found in the video game, and/or could be previously stored in the ad server based on the ad server's knowledge of which game the game client system is running. This list of acceptable types/genres of ads can be stored in the ad server, and advertisements that do not appear on the list would not be sent to the game client system. For example, the list may include an indication of which physical types of ads are acceptable, such as a 280×160 pixel, 16 color texture advertisement, or a 80 pixel square having 4 colors. Further, the advertisements may include object "skins", such as clothing, covers, hats, etc., and entire characters that could be advertisements, such as a person carrying a signboard, or a game monster, etc. Additionally, player and non-player objects could be presented as advertisements, or have advertisements placed on them. Simply stated, any object or any part of any game is capable of being used as an advertisement, or having some sort of advertisement placed on it depending upon the desires of the game's developers. The actual list of advertisement types for a particular game is preferably designated and defined by the game developers, using the SDK, because the game developers can most appropriately decide which advertisements best suit the particular game. Shortcut indicators such as numeric codes could be developed and standardized across the games that include the dynamic ad inserter. For instance, there could be Everquest ad types 1-15, and Asheron's Call ad types 1-35. Or, a generic sample of advertisements could be supplied with the SDK, for example Generic ad types 1-40, and special ad types for each game could be added to this list.

With respect to genres, as described above with reference to FIG. 2, because all types of ads may not be suitable for all game users, embodiments of the dynamic inserter allow the game client system to specify certain genres, or classes of ads that are not acceptable to that game client. Similar to the list of types described above, the list of all of the genres in a game could be sent in step 601, or the individual genre matching an ad tag could be sent as the ad tags are individually found in the game. An example genre of ads may be beer or other alcohol type ads, which should not be targeted to those too young to purchase such products. In that case, the game client system 106 would indicate to the ad server that such a genre of advertisements is unacceptable; and such ads would not be inserted into the game. (Note, as above, that such control can take place at the server or the client side of the communication.) Also, many games feature some parental control mechanism to limit the violence level or for other reasons. The genre restrictions for ads is preferably consistent with these parental control features, in that, when the appropriate level is set by the parent, a list of prohibited genres is generated for sending to the ad server. In addition, a preferred type of genre, such as sports, could also be sent to the ad server, and those type ads would be selected with more frequency compared to the others, as further described below.

The list of acceptable ad types and genres that the game client system presents to the ad server can be sent to the ad server in many ways and at different times. As mentioned above, the game client system could send an entire list of all of the acceptable ad types/genres in the entire game as part of establishing the communication link with the game server (step 601 in FIG. 6). In this manner, the ad server can be notified that ads not conforming to the list will never be used in the current game. Alternatively, the game client system could send a list of all of the acceptable ad types/genres that are in the vicinity of where the player is currently located in the game. An initial list would be sent in step 601 which would have to be updated on a periodic basis. Under this scenario, advertisements that the ad server sends to the game client system are more likely to be used in a short time. Or, the game client system could send only a list of acceptable ad types/genres that are currently active, i.e., those types/genres that correspond to ad tags currently within the field of view of the player of the game. Then, any advertisement that the ad server sends down to the game client system that conforms to those ad types/genres could be inserted into the game immediately, provided that the scheduling information of the downloaded ads was also appropriate and that the field of view remained unchanged.

In addition to sending an entire list of acceptable ad types/genres under any of these scenarios, the game client system may individually update the list stored on the ad server. For example, the game client system may initially send a full list of acceptable ad types that are currently in use. Then, as the player moves around in the game, exposing other ad types, the game client system could send a message to the ad server through the dribble pipe (e.g., an "update event") to add or delete various ad types on an individual basis. Note that sending the list of acceptable ad types is not the same as sending the list of advertising tags found in the game. For example, there may be 100 advertising tags in the game that fall into only two acceptable ad types and three ad genres. In this case, preferably only the list of the acceptable ad types and genres, and not each of the advertising tags, would be sent to the ad server. In practice, this could involve maintaining a list of acceptable ad types/genres on both the game client system and the ad server, and, when the game client system finds a new ad tag in the game (step 206 of FIG. 2), the game client first updates its list, then sends the update over the dribble pipe to the list on the ad server. Deletions could be similarly handled.

In addition to supporting selection of ads by type, genre, and scheduling criteria, the dynamic inserter can support the automatic targeting of ads based upon additional information sent from one game client system to the ad server. For example, a player's "Avatar" contains character information that the player has chosen to use to represent him/herself while playing the game. Certain information can be heuristically gleaned from data regarding the selected Avatar, which can then be used to target (select specifically for that player) ads. For example, game behavior analyzers believe that the gender of a chosen Avatar is more likely than not a good predictor of the actual gender of the player. Using this information, an ad server can select ads that have been shown to be statistically more pleasing (and thus more likely to be effective) to players of that gender. Similarly, other characteristics such as a measure of the level of aggression of a player based upon the game choices made can be gleaned from the player's chosen Avatar and sent to the ad server for ad selection.

In step 602 of FIG. 6, once communication is established with the game client system, the dynamic inserter must determine which ad to send to the game client. Preferred embodiments of the dynamic inserter will provide a preferred ad type and genre to the ad server. In this manner, the ad server can simply choose an ad from its database that conforms to the ad type and genre, and prepare the selected ad for sending it to the game client system. Preparation may include compressing, or otherwise modifying the ad for transfer. Typically on the ad server there would reside more than one ad that meets the preferred type and genre descriptions. For example, if the type of the ad was a clothing logo and the genre was sports, examples of conforming ads could include emblems of NIKE, FILA, MITRE, etc. A decision thread or process running on the ad server would select one of the ads to send to the game client system. If instead, no type or genre is specified, the decision thread simply selects any ad from its database, and allows the game client system to determine whether it is appropriate (for example, perhaps by an advertiser supplied order) in step 207 of FIG. 2. This second method may not be preferred because the probability that the ad will not be a conforming one is high, and the downloaded ad may simply be wasted. Since the dribble pipe connection is very small and slow, the determination of which ad to send should be as accurate as possible because, if an ad is sent that cannot be used by the game client system, the download (and bandwidth) is wasted. Wasted downloads also should be avoided because they could frustrate revenue generation by preventing the client game system from receiving advertisements that can be inserted into the game.

Step 603 of FIG. 6 provides that, once an advertisement has been selected to send to the game client system in step 602, the selected ad is transmitted to the game client through the dribble pipe connection. In addition to sending the advertisement in the step 603, information about the ad is also sent by the ad server to the game client system. Information such as scheduling information of the ad, as well as a description of the ad is preferably sent to the game client system. The game client system can use the scheduling information to determine when to insert the downloaded advertisement into the video game.

After the advertisement has been sent to the game client system and inserted into the video game. Then, in step 604, the game client preferably sends a response back to the ad server to log the event. Additionally, the ad server notifies the ad scheduler in the ad server of which ads were sent to the game client systems, whether they were requested or selected, and as much other information as possible about the system. This information may instead or also be sent to a billing system if one is available. For example, the ad server may report that "advertisement "A" sent to game client system "B" at time "C". Logging data from both the ad server and from the game client system in the ad scheduler are represented in step 604 of FIG. 6.

The information logged in step 604 is used for a variety of purposes. Foremost, it is used for billing the advertiser, in that each time an ad is inserted into a video game, it is known by the advertiser that it appeared on the game player's screen. Additionally, as discussed above, some level of the quality of the exposure to advertising spot may be also gleaned and reported. This information can also be used in billing the advertiser, perhaps by charging more for premium advertising spots or long duration. Also, some advertisers may want to purchase a guaranteed minimum number of impressions. The information logging step 604 allows the ad servers to track this data in real-time, in that a program connected to the ad scheduler can easily track the number of ad impressions of a particular ad or advertiser. Once the minimum number of impressions are met, the ad scheduler can choose another advertiser's advertisement in the selection step 602. The information logged in the step 604 can also be used for statistical analysis and reports, such as which advertising tag location in a video game yields the most or highest quality insertions, and other analyses.

In step 605, the dynamic inserter checks to see if the game client system is still responding on the dribble pipe by either requesting other ads or sending ad placement events to be logged by the ad server, or by even sending useless fill data. If the game client system continues sending data, the flow loops back to step 602 to determine if the game client is requesting a specific ad. If instead the game client system is no longer responding, then the ad server flow will shutdown in step 606 by closing the link established with the game client system in step 601. The shutdown event is logged in step 607.

Figure 7:
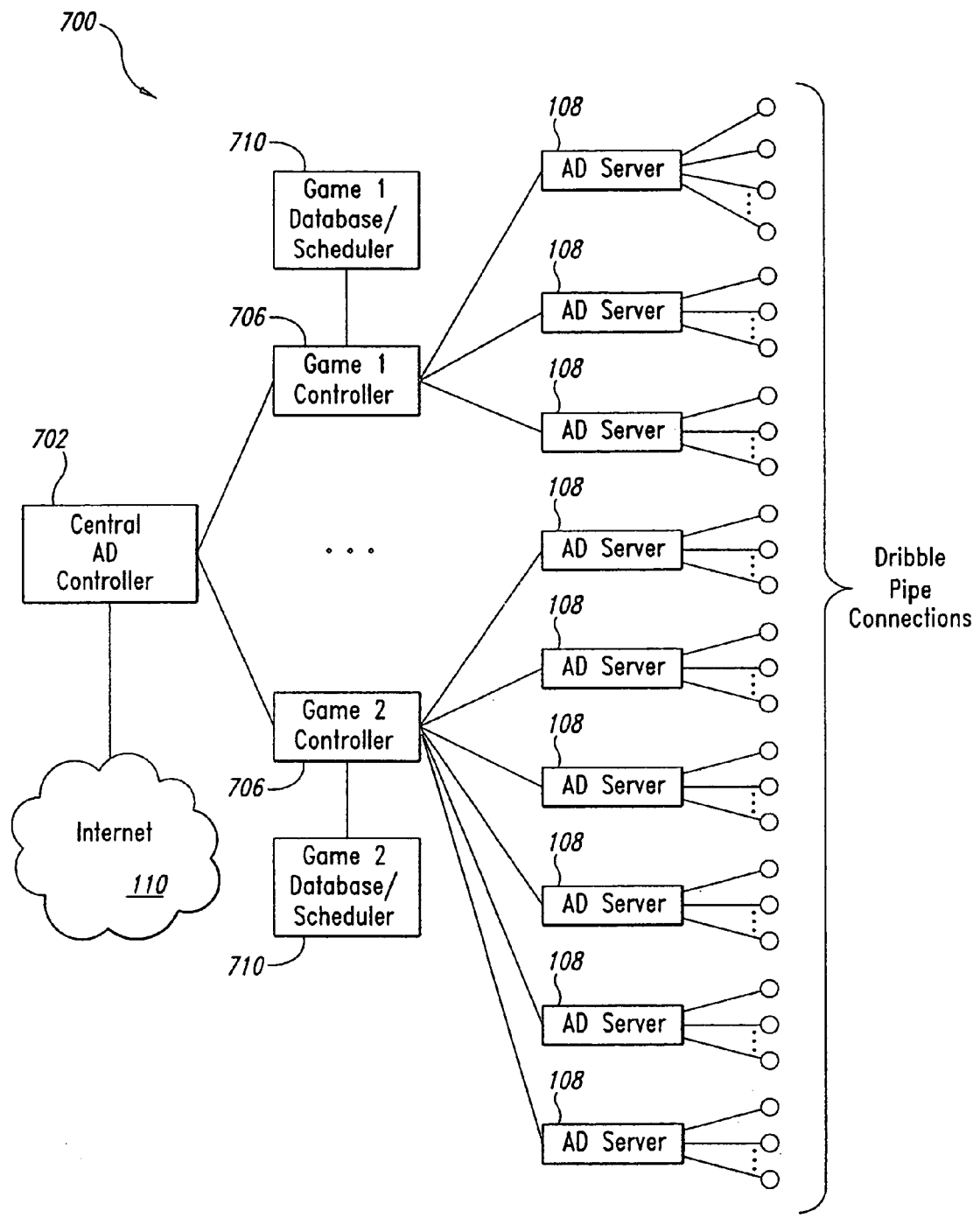
FIG. 7 is an example block diagram of an ad server farm according to an embodiment of the invention.

FIG. 7 is an example block diagram of an ad server farm according to one embodiment of the invention. An ad server farm embodiment is especially useful for supporting dynamic ad insertions into MMRPG games. The ad server farm 700 of FIG. 7 includes a central ad controller 702 coupled to the communication network, for example Internet 110 of FIG. 1A. In one example embodiment, the central ad controller 702 acts as the terminal address for a Domain Name System (DNS) lookup performed by the game client system as a first portion of the game client establishing a connection to the ad server (step 203 of FIG. 2). In other words, when the game client system begins to establish communication with the ad server, it will need to determine an IP address to which to send the initial communication. If the IP address is not hard coded into the game running on the game client system, the first step in finding the IP address is to request a DNS lookup, which links an IP address to a machine name, e.g., www.adserverfarm700.com. The result of the DNS lookup provides the IP address of the central ad controller 702 shown in FIG. 7. The central ad controller 702 receives the first communication from the game client system.

Once the central ad controller 702 receives the first communication from the game client system, it knows the IP address of the game client system. The central ad controller 702 then communicates with the game client system to determine various information from the game client. For instance, the central ad controller 702 may initially provide a challenge-response to the game client system to be sure it is an actual game user, and not a hacker or other unauthorized user. The challenge-response could be as simple as sending the game client system a number, and having the game client change the number in a known way and send it back. The challenge-response coding could be included in the aforementioned SDK used to create the game running on the game client system. After the challenge-response step is cleared, the central ad controller 702 ascertains from the game client system which video game it is currently playing. The game client system may send this information directly, or it could send an IP address of the game server that it is connected to, and the central ad server 702 will then determine which game is hosted at that particular game server. The central ad controller 702 needs to determine the game underway to establish a connection between the game client system and an ad server that is configured to serve a particular type of game. It is not necessary, of course, that the ad server be dedicated to one type of game, as it would be relatively easy to implement a single server to be able to send ads for different types of games. However, the number of servers in the ad farm must be large enough to handle the capacity of the number of players playing the games. Some of the MMRPGs have thousands of individual players playing at any one time. A peak time of interactive Internet game play is on Sunday afternoons. Therefore, in order to service all of the players simultaneously playing at the peak period of play, a distributed system must be set up to handle all of the traffic to send to all of the client systems that could be simultaneously playing the MMRPG.

Once the central ad controller 702 determines which type of video game is executing on the game client system, it will route an identifier of the game client system to a game controller 706. If only a few games were supported by the dynamic inserter (FIG. 1A), the number of game controllers 706 in the ad server farm 700 could be few, and as few as 1. However, as the number of players of different types of games using the dynamic inserter expands, it is preferably convenient to have a game controller 706 for each type of video game supported. The game controller 706, in turn, controls a set of ad servers, particular for the same type of video game as the game controller 706. For instance, there could be one game controller 706 dedicated to Ultima Online, which would in turn manage a set of ad servers particular to Ultima Online. Additionally, there could be a one game controller 706 dedicated to Everquest, which would in turn manage a set of ad servers particular to Everquest. Also coupled to each game controller 706 is a DB/scheduler 710. Similar to the game controllers 706, there is a DB/Scheduler 710 for each separate type of game supported by the dynamic inserter. The DB portion of the DB/Scheduler contains a list of all of the advertising types and genres in a game, and perhaps a list of all of the advertising tags themselves. Also, it stores the actual advertisements, and the data about the advertisements, such as type, genre and scheduling data. Further, the DB portion of the DB/Scheduler 710 may keep track of all of the advertisements downloaded from the ad servers to the game client systems, and all of the insertion events performed by the game client and sent back to the ad server. One skilled in the art will recognize that the DB portion may represent an entire distributed computer system used to implement a data repository. The scheduler portion of the DB/Scheduler 710 (the ad scheduler) selects which ads will be the next to be downloaded by the ad server to the game client system.

FIG. 7 illustrates a set of ad servers, each connected to a particular game controller 706. An ad server, when fully connected, has many connections to different game client systems, as indicated in FIG. 7. Each connection is preferably a dribble-pipe connection, as discussed with reference to FIG. 2, and each of the ad servers has a dribble-pipe connection with many game client systems. Once a particular ad server is assigned to a particular game client system connection, the IP address of the selected ad server is sent to the connected game client system. From then on, the communication between the game client system and the ad server farm 700 is directly through the assigned ad server, and not through the path of the central ad server 702, to the game controller 706 to the ad server, thus yielding greater efficiency.

The maximum number of simultaneous dribble-pipe connections that a particular ad server can support is limited by its connection speed to the Internet, the packet traffic over the connection, and the overall speed of the bus that connects the ad server to the communication network. Although an initial estimate on the maximum number of dribble pipe connections per ad server that is connected to the Internet by a T1 line is approximately 1000, the actual number is likely best determined empirically and the number of ad servers in the ad server farm 700 modified accordingly.

One of the functions of the game controller 706 is to balance the loading of its associated ad servers. Each of the ad servers coupled to one of the game controllers 706 has a maximum number of simultaneous connections that it can accept. As discussed above, the number of simultaneous connections is limited by the bandwidth of the connections of the ad servers to the communication network, as well as by other factors. One way to load balance the ad servers is to initially allocate a certain number of ad servers to a particular game controller 706. Then, as requests for connections to the ad servers are received by the individual game client systems, they are distributed among the various ad servers one by one. So, for each additional connection requested, a new ad server in the allocated group is selected. Once all of the allocated ad servers in the allocated group have one connection, the game controller 706 then routes the next connection request by a game client system to the first ad server, which will then have two connections. This cycling continues until all of the ad servers connected to the particular game controller 706 are at or near capacity. Then, if necessary, the game controller 706 could add a new ad server that is either idle, or one that is not currently being used to capacity for another game. Once this is finished, the game controller 706 for the first game then adds future connection requests from additional game client systems to the newly apportioned ad server. Therefore, the primary functions of the game controllers 706 in the ad server farm 700 are to load balance all of the ad servers, as well as to direct new connections from game client systems to a proper ad server.

In order to maintain as many dribble pipes as possible, there must also be some sort of IP traffic load balancing on the individual ad servers. Because the dribble pipe connections, as mentioned above, are to be continuously and minimally intrusive, it must be determined how intrusive the dribble pipes can be. In other words, the amount of data traffic that the dribble pipe connection can carry while still being unobtrusive will be dependent on the connection speed between the game client system and the communication network. FIG. 8 is an example chart of traffic that is scheduled by a process or thread running on an ad server. Shown in the rows are different types of connections, for instance, there are 4 connections at 56 k, one DSL, one T1 and one cable modem. The vertical columns show which packets are active for a given time fixed period, for example $\frac{1}{100}$ of a second.

The data in each row/column is a pointer to a prepared data packet, which can be any size up to the UDP maximum of 1452 bytes. In essence, a dispatcher instructs the ad server to send out a packet as they are indexed, for each time period. The scheduling of which packet appears in which time period accounts for the difference in connection speed, as well on the overall IP load of the ad server. It can be seen that the T1 connection has packets in each time slice, so that after the $12^{th}$ time period, it has received 12 data packets. This is because the T1 connection can download so much data that 12 packets in 12 time periods will still remain unnoticed by the game user. A 56 k modem connection, on the other hand, cannot accept that much data without being obvious to the game user, so one data packet is sent only every so often, for example, every 10 time periods.

In addition, not all of the first packets are necessarily sent at their first opportunity, otherwise it could possibly overload the IP traffic on the ad server. Specifically, with reference to the first time period $T_1$, first packets are sent to the T1, DSL, and Cable modem connections, but only to one of the four 56 k connections. The purpose of this is to load balance the IP traffic. In the second time period, $T_2$, packets are sent to the T1 and the second 56 k connection, and so on. The DSL connection gets packets sent every 3 time periods, and the cable modem every 2. The above numbers are representative only, and will likely have to be determined empirically and can be dynamically adjusted by an ad server. In one embodiment, the ad servers may be able to maintain a connection between 30 and 900 bytes per second on the dribble pipe, depending on the connection speed of the particular game client system.

As was seen in step 602 of FIG. 6, the ad server is charged with determining which ad to next send to the game client system over the dribble pipe. FIG. 7 shows that this decision is made by the ad scheduler that is coupled to the particular game controller 706. One of the primary jobs of the ad scheduler is to keep the memory of the game client system filled with advertisements that the game client can use best and most often. For example, the memory of the game client system may only be large enough to hold 16 advertisements. The ad scheduler attempts to ensure that only advertisements that can be used in the video game are downloaded into these 16 spaces, and that there are no others that could be better used by the game client system.

First, several cases are easily addressed, such as when a video game on the game client system can accommodate only one ad type. In that case, the decision of the ad scheduler as to which ads to send is limited only by genre and scheduling time/order, and only the single type that can be accommodated from this set are sent. Some of the advertisers can make an insertion decision easy as well, for instance an advertiser may create a billboard ad of a popular size (i.e. there are several advertising tags linked to billboard objects of the same size in one game or there are several games that use the same advertising tagged billboard), which therefore can be inserted into many different locations, no matter what the game player's field of view. In that case, the ad scheduler can generally always send the COKE ad to the game client systems because it has a high likelihood of being inserted into the video game. In a similar vein, the game client system might have a set of generic ads built into it, either during development or downloaded from the SDK. This allows the game client system the ability to insert some advertisements into the video game even before advertisements are dynamically downloaded from the ad server.

In absence of such easy cases, the ad scheduler must make educated guesses about which ads to send to the game client systems. However, the decisions are not permanent. Preferably the ad scheduler can send an instruction to the game client system to have it delete an advertisement that is already stored in the memory system of the game client. This way, the ad scheduler can monitor all of the advertisements that are stored in the game client system, and, if some of them are never being used, can substitute one that is more likely to be used.

When scheduling which advertisement to send to the game client system, the ad scheduler reviews which ads are available to be inserted to the game with respect to ad type, genre, timing considerations, etc. Because these requirements may be continuously changing, embodiments of the ad scheduler are capable of operating in a mode where all of the limitations are checked prior to sending an ad to the game client system. For example, if the ad scheduler decides not to send advertisement "A" to a game client system at a particular time, that does not exclude the advertisement A from ever being sent to the game client. For instance, if advertisement A was not initially sent because the game client system indicated that it had not experienced the matching ad tag type in the game, once the matching ad tag type was requested by the game client, the ad scheduler 710 could then choose to insert advertisement A.

One of the considerations for choosing which advertisement to send to the game client system is the game user's local time. As described above, the machine time can be easily obtained from the operating system, or it may be possible to determine the game user's time zone by a lookup of their IP address. In addition to sending ads based on scheduled local time insertion (or range of valid local times), the ad scheduler can use "world unified time" to determine when advertisements should be sent. For instance, a featured ad could be a large, centrally located billboard that is the same for every user of the game. Then, different game users could use inserted advertisements as landmarks, and broadcast messages to fellow players such as "meet at the ALFA-ROMEO car dealership in 5 minutes." The ad scheduler could track both the user's local time and the world unified time, and insert ads based on either or both schedules. Also, with a system that operates in two different time references, the ad scheduler can organize advertisements that could be directed to all of the users simultaneously, or that could be targeted only to specific users. For example, a billboard object may generally have an advertisement for the latest movie, except for a two-hour slice between 5 and 7 pm in user's local time where the billboard advertises a restaurant.

Another consideration for choosing which advertisement to send to the game client system is the total number of times an ad has been seen by game users. The ad scheduler can factor in the number of times a particular advertisement has been seen when deciding which ad to next send to the game client system. For example, an advertiser may pay for 1000 ad views over a 3 hour period. The ad scheduler can send these conforming ads to the game client system, and then, by checking the insertion data sent back by the game client, determine that the requisite number of ad views have been inserted, and no longer send that advertisement during the contract period. This leaves the ad scheduler free to select other advertisements to send to the game client systems, for even more fee generation.

Regardless of how advertisements are chosen by the ad scheduler, they are constantly downloaded to the game client system during the time that the dribble pipe is established and dictates. Constantly sending advertisements to the game client system makes sense for many reasons. First, in order to be as unobtrusive as possible, the dribble pipe should be constantly sending data between the game client system and the ad server. If the dribble pipe is a small portion of the total bandwidth of the game client system, and is nearly constant in the amount of data it is sending, the game user is less likely to detect it exists. In order to remain unobtrusive, the ad server will try to use any "empty" space in the dribble pipe to send an ad that is most likely to be used by the game client system. By intelligently guessing which ad may be most likely to be used in the game client system, the average latency from when the game client finds an advertising tag to when the advertisement is inserted into the game is preferably decreased.

As mentioned above, the dribble pipe connection between the ad server and the game client system preferably should remain as full as possible, in order to not be noticeable by the game user. Therefore, if the memory of the game client system is full, it is not beneficial for the ad server to send any more data, because it must be purged by the game client system after it is received. In this instance, when there is no data to send between the ad server and the game client system, the UDP packets will be filled with zeros or some other number that indicates that it is non valuable data and can be thrown away by the game client system. In this way, the user should not notice any change in connection speed from when an advertisement is being loaded into the game client system, and during other times, for example.

A further example of ad scheduler heuristics is that the ad server can send the game client system ads that are adjacent to other advertisements that the game client has already requested. For example, if the game client system has indicated new advertising types in a certain known order, the ad scheduler could anticipate which advertisement type will be next requested, and send a conforming ad even prior to the game client indicating that the new advertising type is available. Similarly, the database connected to the ad server has a listing of all of the advertisements, and the ad server could, in absence of sending an advertisement requested by the game client system, send a conforming ad that could be inserted in the "vicinity" of the last ad inserted by the game client. This concept can be thought of as a "filtered push."

The video game presented by the game client system will be designed to include advertisements, and, as discussed above, will appear to be more realistic when it does. In order to be inserted into the game, the advertisements need to be stored in the game client system at some point. If they are not placed in the game client system beforehand, they must be downloaded from the ad server. Therefore, sending as many ads as possible gives the game client system the widest possible choices to choose from while the game user is playing the video game.

Design of the dribble pipe should also account for the possibility that some packets will be dropped and must be specifically re-requested, because it preferably uses UDP rather than TCP/IP. If the receiver, which can be either the ad server or the game client system, detects dropped packets or receives packets out of order, it requests that a new group of the last packets be resent. Then, after receiving the new group, the new packets are reassembled, and any duplicate packets discarded.

It should be remembered that the ad server can be coupled to many game client systems, and that the selection by the ad scheduler of which ad to next send in step 602 can be different for every connected game client. In this case the ad scheduler keeps track of information on a per client, per session basis. In one embodiment, this tracking is implemented using well-known database techniques.

As mentioned with respect to FIG. 1B, in some embodiments, the game client system includes enhanced game objects (e.g., enhanced game objects 158), which are game objects or components that have been modified to take advantage of branding. For example, a game object may incorporate new behaviors or powers in response to a player viewing, manipulating, or otherwise interacting with an advertisement, as defined for that object and advertisement combination. This capability gives players the impression that branded entities do something different, so they will start searching for ads, thus hopefully increasing the ad exposure for popular ads and hence potential revenue. For example, a player may gain a supernatural power burst (power pills) when the player drinks a Mountain Dew pop from a pop machine (having an ad on it for Mountain Dew). Or, as another example, when a player driving a race car in a racing game drives by a billboard ad that advertises Ferraris, the player's car may inherit additional speed powers.

Similarly, techniques for drawing a player back to a particular ad can be effective when used in combination with these enhanced game object incentives. For example, a "code" obtained from something in the real world, for instance a number from a wrapper on a hamburger, or an electronic "cookie" from a visit to a particular website, can be entered into the game to initiate a change in object behavior. Depending upon the sophistication of the game software, these behaviors can also change dynamically and thus provide a welcome degree of intrigue and randomness to the game player.

Since each game implements its objects according to its own conventions, how a particular game modifies content is game (and developer) specific. However, a game programmer skilled in the art of his/her game programming can determine how to modify objects for that game without undue experimentation. In a game that is coded in an object-oriented programming language such as C++, for example, each object is typically coded as a class, with methods defining the various behaviors of the object. These methods can be hooked to invoke ad related code supplied by an SDK for the ad client. Although the particular game code that needs to be modified will differ from application to application, hooks and code for receiving and responding to interactions with ads can be standardized. (How an object changes behavior in response to an interaction will be game specific, however.)

For example, using the techniques already described for inserting ads dynamically, a game object can be made to incorporate new behaviors over time as the ads change. Specifically, to recognize that a particular ad will yield a particular behavior, the ad type characteristic forwarded to the ad server can be standardized to communicate this information. For example, developers who wish to implement increased "powers" for Asheron's call objects may standardize an ad type for this purpose such as "Asherons_call_powerincrease." Asheron's call would contain objects that have been programmed to invoke their "increase_power" methods when the object finds that the player has encountered an ad of type "Asherons_call_powerincrease." Thereafter, when an ad with this ad type is inserted into the game client and upon the player encountering the ad, the object would "automatically" appear to increase its own power. One skilled in the art will recognize that other implementation techniques and standards also can be used.

From the foregoing it will be appreciated that, although specific embodiments of the invention have been described herein for purposes of illustration, various modifications may be made without deviating from the spirit and scope of the invention. For example, one skilled in the art will recognize that the methods and systems discussed herein are applicable to other areas and devices other than video games having ads dynamically incorporated, such as PDAs, pagers, email, web browsers, newsreaders, online books, navigation devices, other multimedia devices and environments, etc. In addition, different forms of content can be dynamically incorporated into multimedia targets, including, but not limited to, code, webpages, HTML, Java, XML, audio, video, and static or animated text or graphics. One skilled in the art will also recognize that the methods and systems discussed herein are applicable to differing protocols and communication media (optical, wireless, cable, etc.) and that the techniques described herein may be embedded into such a system. Also, all of the above U.S. patents, patent applications, foreign patents, foreign patent applications and non-patent publications referred to in this specification and/or listed in the Application Data Sheet, including but not limited to U.S. patent application Ser. No. 09/998,901, filed Nov. 29, 2001, entitled "METHOD AND SYSTEM FOR DYNAMICALLY INCORPORATING ADVERTISING CONTENT INTO MULTIMEDIA ENVIRONMENTS," and U.S. Provisional Application No. 60/250,060, filed Nov. 29, 2000, entitled "METHOD AND SYSTEM FOR INCORPORATING DYNAMIC ADVERTISING IN GAME SOFTWARE" are incorporated herein by reference, in their entirety. Aspects of the invention can be modified, if necessary, to employ methods, systems and concepts of these various patents, applications and publications to provide yet further embodiments of the invention. In addition, those skilled in the art will understand how to make changes and modifications to the methods and systems described to meet their specific requirements or conditions.

The invention claimed is:

1. A method for dynamically incorporating advertisements into an executing multimedia environment, comprising:
   during a real-time presentation of the multimedia environment:
   detecting, using a processor, an advertising tag having an associated set of criteria;
   dynamically receiving over a communications medium a plurality of advertisements using a dribble pipe, wherein the dribble pipe receives packets at scheduled times during the presentation of the multimedia environment, and wherein the packets comprise advertising data associated with the plurality of advertisements;
   determining, using the processor, that none of the received plurality of advertisements matches the set of criteria associated with the detected advertising tag;
   sending a request, including the set of advertising criteria associated with the detected advertising tag, over the communications medium for one or more other advertisements that match the set of advertising criteria associated with the detected advertising tag upon the determining that none of the received plurality of advertisements matches the set of criteria associated with the detected advertising tag;
   receiving, in response to the request, one or more other advertisements that match the set of advertising criteria associated with the detected advertising tag; and
   presenting content associated with one of the one or more other advertisements in a location indicated by the detected advertising tag, such that the presenting of the multimedia environment does not appear to be interrupted or paused to incorporate the one of the one or more other advertisements into the real-time presentation of the multimedia environment.

2. The method of claim 1, wherein the multimedia environment is a computer game environment and the code that presents the multimedia environment is a computer game, and the real-time presentation of the multimedia environment comprises an interaction with an avatar of the multimedia environment.

3. The method of claim 1, wherein the multimedia environment is a multimedia application executing on at least one of a personal computer, a server, a game console, a PDA, a handheld wireless device, a mobile communications device, or a telecommunications device.

4. The method of claim 1, wherein the set of criteria comprises at least one of an advertisement type, an advertisement genre, or scheduling information.

5. The method of claim 1, wherein the received plurality of advertisements is continually received to achieve a constant performance impact.

6. The method of claim 1, further comprising using a connectionless communication protocol to dynamically receive the plurality of advertisements.

7. The method of claim 1, wherein the presenting content associated with the one of the one or more other advertisements in the location indicated by the detected advertising tag comprises presenting content associated with the one of the one or more other advertisements in a location on an object depicted by the multimedia environment.

8. The method of claim 1, wherein the location is an object depicted by the multimedia environment.

9. The method of claim 1, wherein at least one of the received advertisements includes as associated set of criteria comprising at least one of an advertisement type, an advertisement genre, or a presentation schedule.

10. The method of claim 1, further comprising decompressing the content associated with the one of the one or more other advertisements before presenting the content associated with the one or the one or more other advertisements.

11. The method of claim 1, further comprising decrypting the content associated with the one of the one or more other advertisements before presenting the content associated with the one of the one or more other advertisements.

12. The method of claim 1, wherein the presenting content associated with the one of the one or more other advertisements comprises at least one of playing audio data, playing video data, or executing received program code associated with the conforming advertisement.

13. A non-transitory computer-readable storage medium having instructions stored thereon that, if executed by a computing device, cause the computing device to perform operations comprising:
   during a real-time presentation of the multimedia environment:
   detecting an advertising tag having an associated set of criteria;
   dynamically receiving a plurality of advertisements using a dribble pipe, wherein the dribble pipe receives packets at scheduled times during the presentation of the multimedia environment, and wherein the packets comprise advertising data associated with the plurality of advertisements;
   determining that none of the received plurality of advertisements matches the set of criteria associated with the detected advertising tag;
   sending a request, including the set of advertising criteria associated with the detected advertising tag, for one or more other advertisements that match the set of advertising criteria associated with the detected advertising tag upon the determining that none of the received plurality of advertisements matches the set of criteria associated with the detected advertising tag;
   receiving, in response to the request, one or more other advertisements that match the set of advertising criteria associated with the detected advertising tag; and
   presenting content associated with one of the one or more other advertisements in a location indicated by the detected advertising tag, such that the presenting of the multimedia environment does not appear to be interrupted or paused to incorporate the one of the one or more other advertisements into the real-time presentation of the multimedia environment.

14. The computer-readable medium of claim 13, wherein the computer-readable medium is a memory of a computing system and wherein the contents are instructions that, when executed, cause the computing device to perform the method.

15. The computer-readable medium of claim 13, wherein the multimedia environment is a computer game environment.

16. The computer-readable medium of claim 13, wherein the multimedia environment is a multimedia application executing on at least one of a computer system, a server, a PDA, a handheld wireless device, a mobile communications device, or a telecommunications device.

17. A multimedia client system comprising:
an output device; and
a processor configured to:
during a real-time presentation of a multimedia environment on the output device:
detect an advertising tag in the executing multimedia environment having an associated set of criteria;
dynamically receive a plurality of advertisements using a dribble pipe, wherein the dribble pipe receives packets at scheduled times during the presentation of the multimedia environment, and wherein the packets comprise advertising data associated with the plurality of advertisements;
determine that none of the received plurality of advertisements matches the set of criteria associated with the detected advertising tag;
send a request, including the set of advertising criteria associated with the detected advertising tag, for one or more other advertisements that match the set of advertising criteria associated with the detected advertising tag;
receive, in response to the request, one or more other advertisements that match the set of advertising criteria associated with the detected advertising tag; and
present content associated with the one or more other advertisements as part of the multimedia environment presented on the output device, such that presentation of the multimedia environment does not appear to be interrupted or paused to incorporate the one of the one or more other advertisements into the real-time presentation of the multimedia environment.

18. The multimedia client system of claim 17, wherein dynamically receiving the plurality of advertisements comprises receiving the plurality of advertisements over a network.

19. The multimedia client system of claim 17, wherein dynamically receiving the plurality of advertisements comprises receiving the plurality of advertisements over a wireless communication channel.

20. The multimedia client system of claim 17, wherein a bandwidth used by the dribble pipe is based in part on a connection speed of the multimedia client system to a communication network.

21. The multimedia client system of claim 17, wherein the multimedia environment is a computer game environment.

22. The multimedia client system of claim 17, wherein the multimedia client system is a game client system that uses a connection to receive advertisements that is separate from a connection to a game server.

23. The multimedia client system of claim 17, the system comprising at least one of a computer system, a server, a PDA, a handheld wireless device, a mobile communications device, or a telecommunications device.

24. The multimedia client system of claim 17, wherein the multimedia environment is a presentation.

25. The multimedia client system of claim 17, wherein the received plurality of advertisements are stored on the storage medium.

26. The multimedia client system of claim 17, wherein the received plurality of advertisements are received at scheduled times or asynchronously during the presentation of the multimedia environment.

* * * * *